US011720694B2

(12) United States Patent
Sillador

(10) Patent No.: US 11,720,694 B2
(45) Date of Patent: Aug. 8, 2023

(54) IMAGE TRANSMISSION SYSTEM THAT ALLOWS TRANSMISSION OF IMAGE FILE SATISFYING PREDETERMINED CONDITION TO SHARED FOLDER, BUT RESTRICTS TRANSMISSION OF IMAGE FILE NOT SATISFYING PREDETERMINED CONDITION TO SHARED FOLDER, AND IMAGE READING APPARATUS

(71) Applicant: KYOCERA Document Solutions Inc., Osaka (JP)

(72) Inventor: Edward Jay Sillador, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/972,647

(22) Filed: Oct. 25, 2022

(65) Prior Publication Data

US 2023/0133514 A1     May 4, 2023

(30) Foreign Application Priority Data

Nov. 2, 2021   (JP) .................................. 2021-179662

(51) Int. Cl.
*H04N 1/44*     (2006.01)
*G06F 21/60*   (2013.01)
(Continued)

(52) U.S. Cl.
CPC ........ *G06F 21/608* (2013.01); *G06F 21/6218* (2013.01); *H04N 1/00241* (2013.01); *H04N 1/00816* (2013.01); *H04N 1/4413* (2013.01)

(58) Field of Classification Search
CPC .............. G06F 21/608; G06F 21/6218; H04N 1/00241; H04N 1/00816; H04N 1/4413
(Continued)

(56) References Cited

U.S. PATENT DOCUMENTS 9,565,175 B1 *   2/2017   Saylor ..................... H04W 4/12
11,516,353 B2 *  11/2022  Hanano .............. H04N 1/00334
2017/0094101 A1 *   3/2017   Saito .................. H04N 1/00307

FOREIGN PATENT DOCUMENTS

JP    2004260417 A    9/2004
JP    2009189028 A    8/2009

* cited by examiner

*Primary Examiner* — Kent Yip
(74) *Attorney, Agent, or Firm* — IP Business Solutions, LLC

(57) ABSTRACT

An image transmission system includes an information processing apparatus and an image reading apparatus. In the information processing apparatus, a first controller generates, upon receipt of authentication information, location information, and restriction information, an access code using the cited information, and transmits the cited information and the access code to the image reading apparatus. In the image reading apparatus, a second controller stores the cited information and the access code, upon receipt thereof, in a storage device. In the case where an image file satisfies a condition indicated by the restriction information, when the information indicating the access code is received, the second controller transmits the image file to the shared folder indicated by the location information, using the authentication information, but keeps from transmitting the image file when the image file does not satisfy the condition indicated by the restriction information.

7 Claims, 24 Drawing Sheets

(51) Int. Cl.
*H04N 1/00* (2006.01)
*G06F 21/62* (2013.01)
(58) Field of Classification Search
USPC ........................................................ 358/1.15
See application file for complete search history.

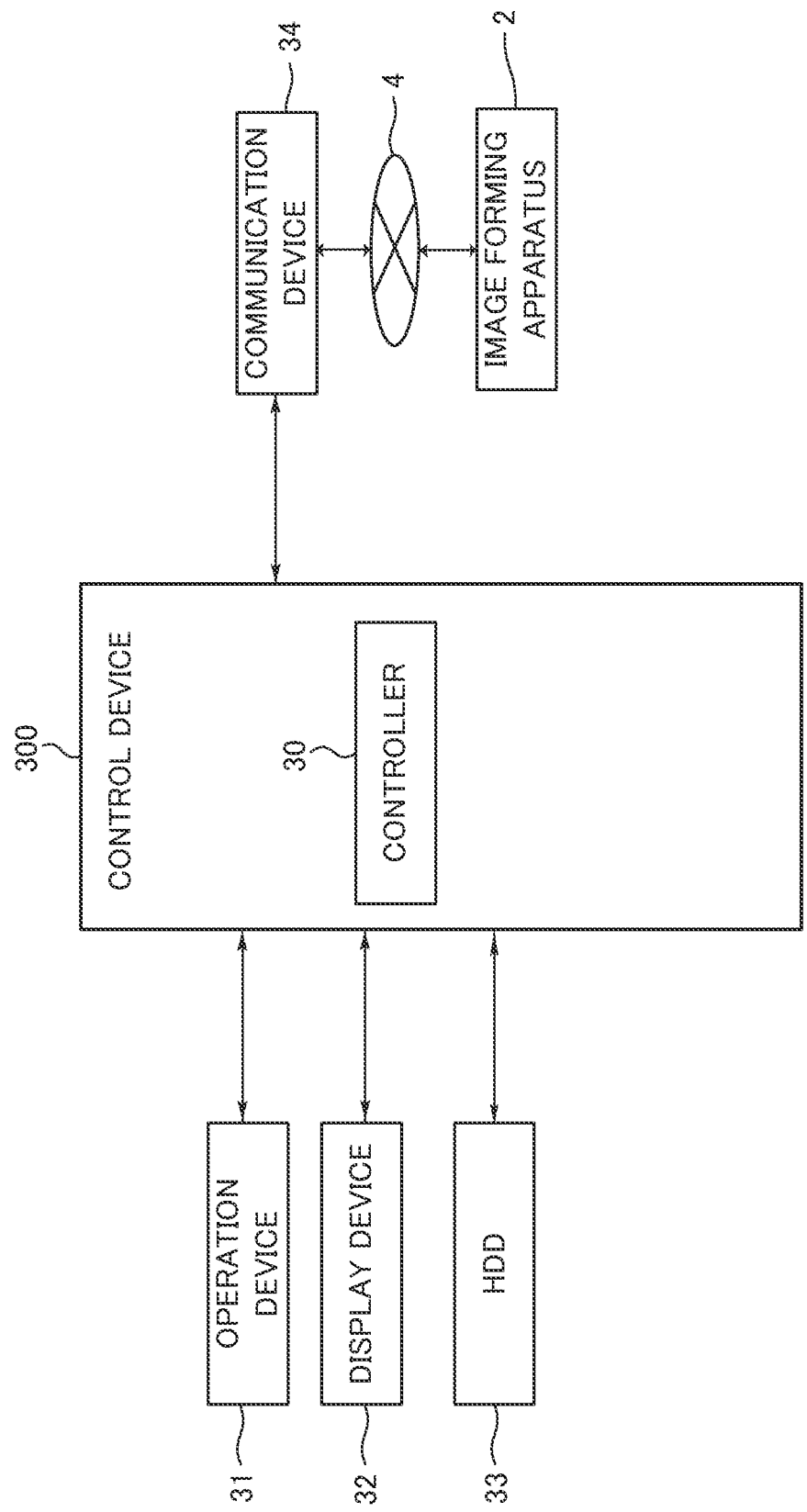

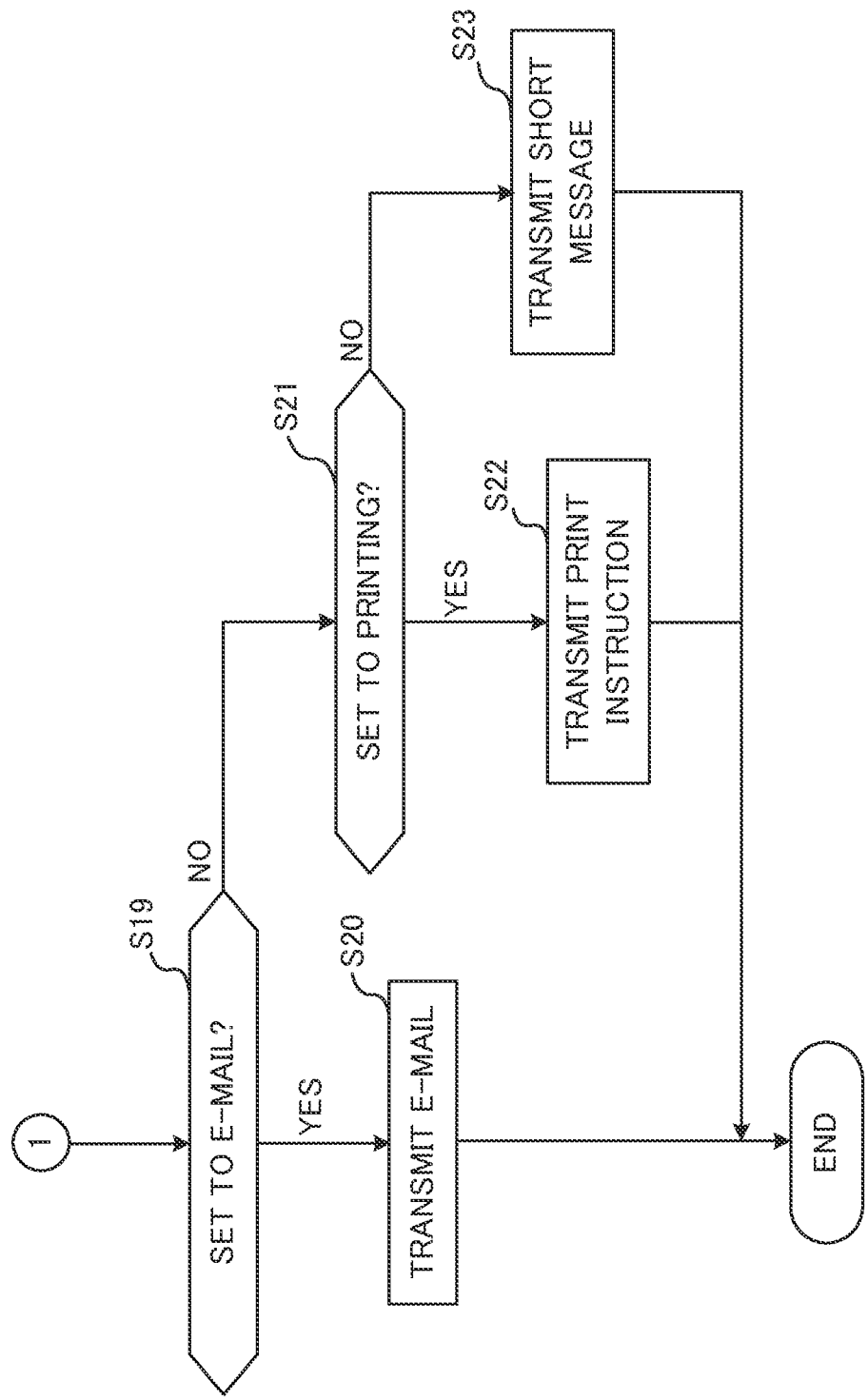

Fig.9

| | User input | MD5 hash | 6 digit hash | |
|---|---|---|---|---|
| HOST NAME | kddipc035 | 6a025792e22d3edb9beb1717239bc424 | 9bc424 | 101A |
| PORT NUMBER | 445 | 67f7fb873eaf29526a11a9b7ac33bfac | 33bfac | 101B |
| PATH | trytry | be4cc9788f52e49485473dc699537388 | 537388 | 101C |
| LOG-IN USER NAME | silladore | 2c2af956a8949e06842d159fc59c1394 | 9c1394 | 101D |
| LOG-IN PASSWORD | pws101 | a81c94917 42b7bbcd8fa323a7da2c8e | da2c8e | 101E |
| FILE SIZE LIMIT | 20 MB | e2fca4ed20d01d1eda8a934cf81cb194 | 1cb194 | 101F |
| EXPIRY DATE | 3/4/2021 | 7a1af23f8dd60bd61d4b9783b56317f2 | 6317f2 | 101G |
| FILE FORMAT | pdf,jpg,docx | d73896 8c67db35a62be3aaf0ad865c16 | 865c16 | 101H |

Fig.11

| Concatenated hash | MD5 hash | 6 digit hash | |
|---|---|---|---|
| 9bc42433bfac | f0dc241d3cc259aa51adef9afa84e2d6 | 84e2d6 | 104A |
| 5373889c1394 | ba3f110300cbdc20bdc72e18bffb03628 | b03628 | 104B |
| da2c8e1cb194 | 53d5f577ecfceba59f451cd8fb8b3cf7 | 8b3cf7 | 104C |
| 6317f2865c16 | 2b5b9208e7af8cf878ff72da999d0a38 | 9d0a38 | 104D |
| 84e2d6b03628 | 56a39ce4f695b422b429167c129ad3e | 29ad3e | 107A |
| 8b3cf79d0a38 | 3bed2df76f8b2b15028e6de7efeec8f1 | eec8f1 | 107B |
| 29ad3eeec8f1 | 83f49cdbbcb85552 4efb7668797e6a0f | 7e6a0f | 110 |

103A, 103B, 103C, 103D, 106A, 106B, 109

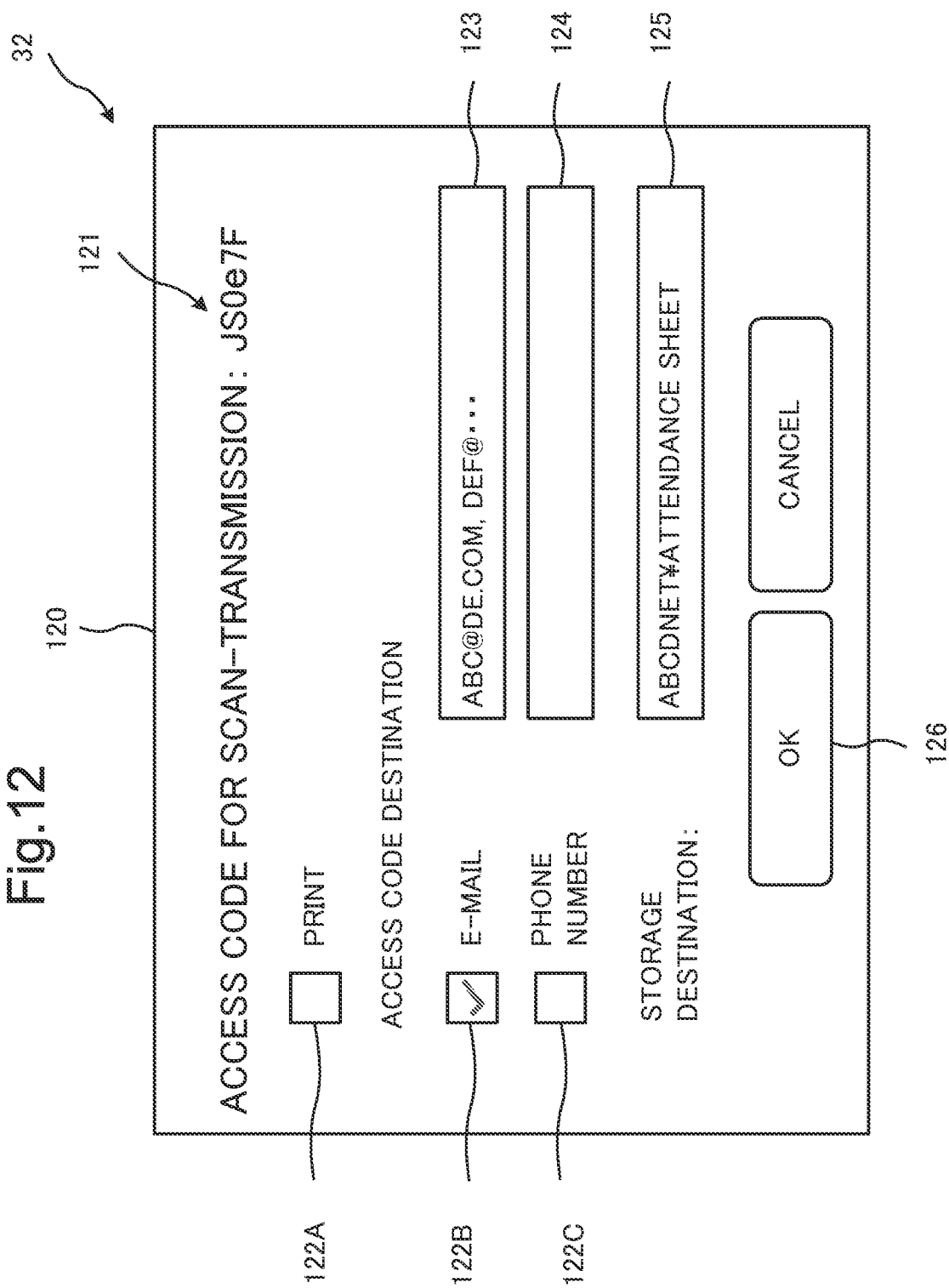

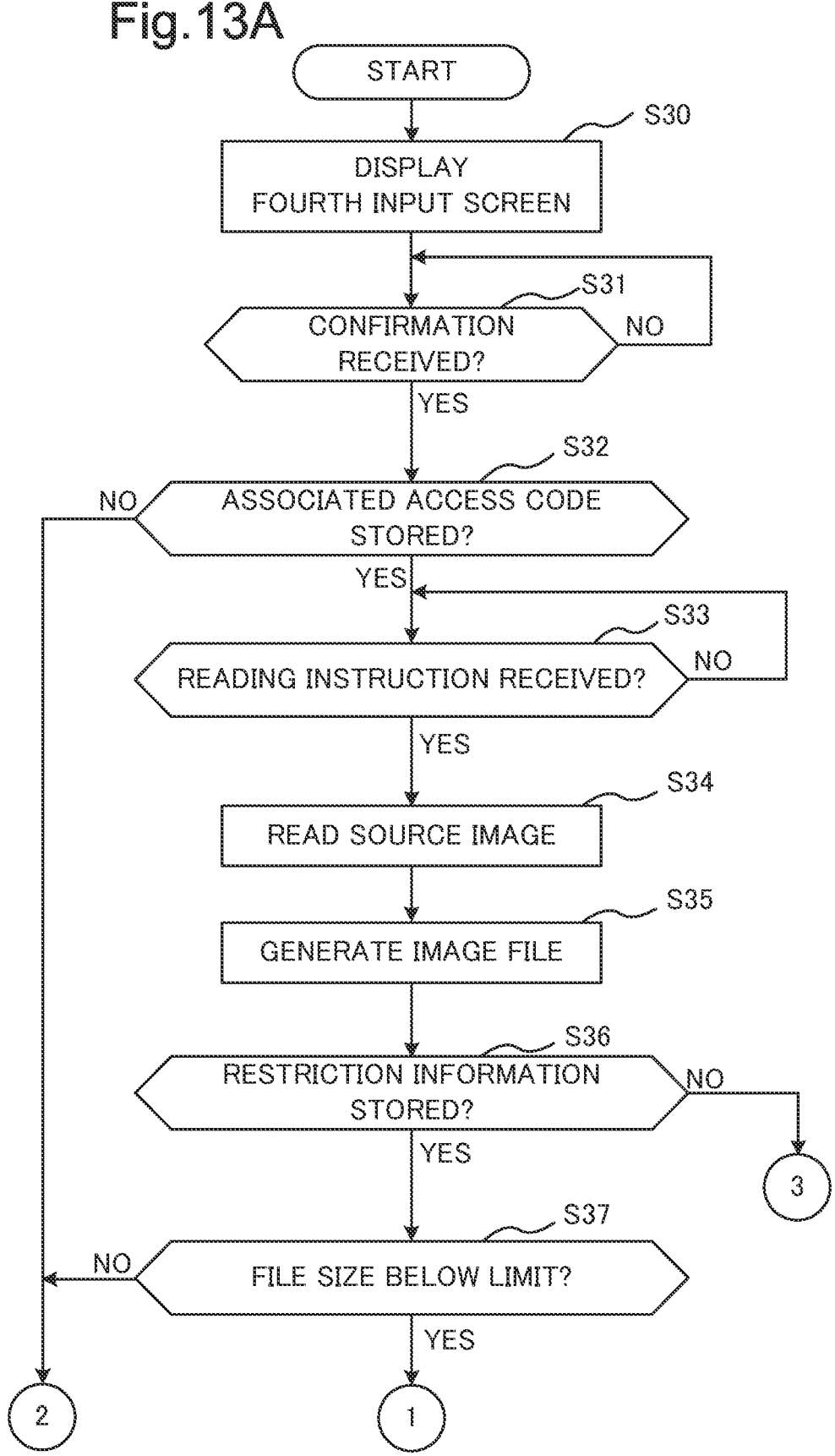

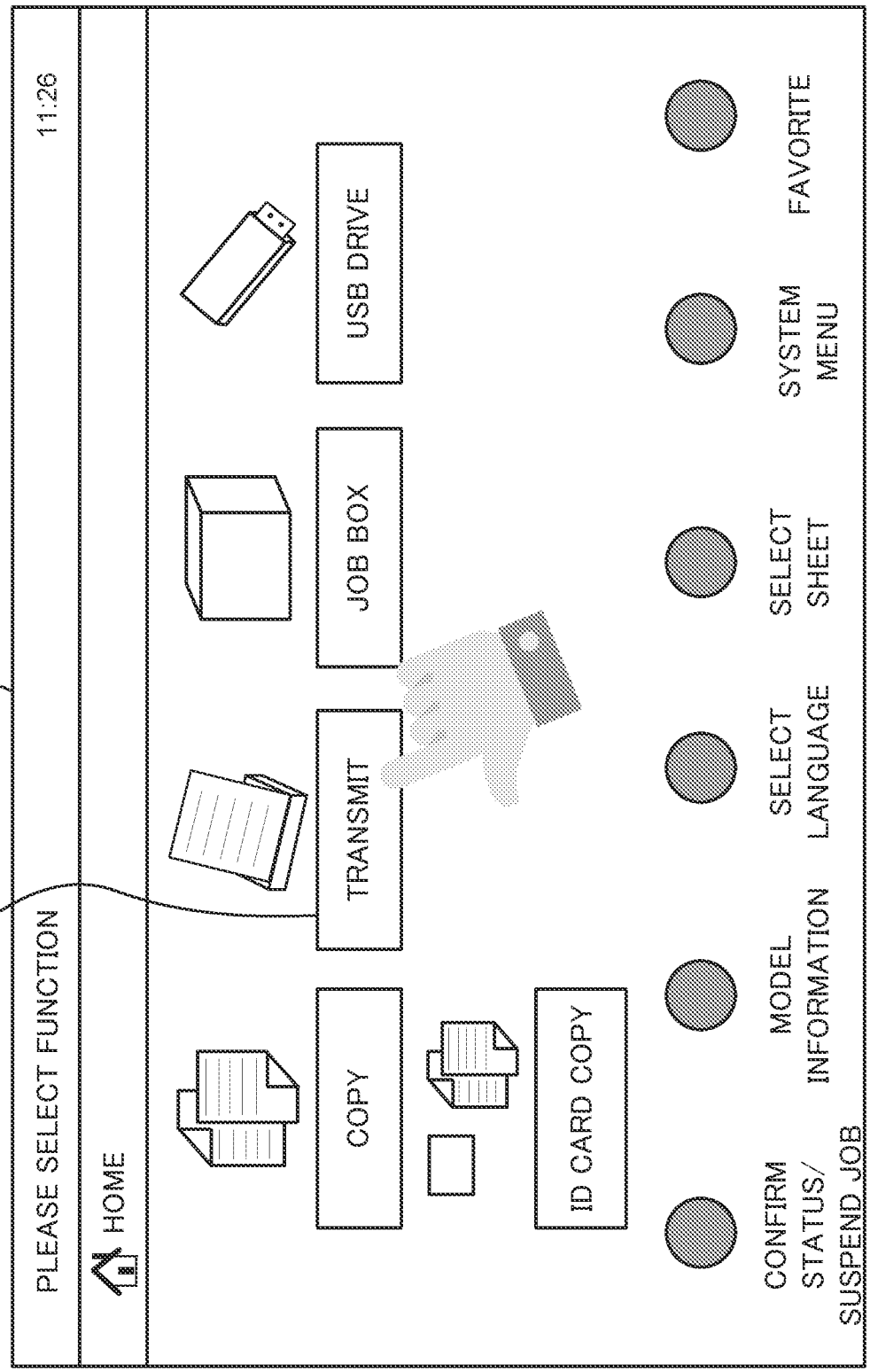

DEPARTMENT MEETING ATTENDANCE SHEET

DATE/TIME: MARCH 10 (WED), 2021, 10:30AM
PLACE:HEAD OFFICE, CONFERENCE ROOM NO. 1

NAME:  ○○○  □□□□

☑  I WILL ATTEND

☐  I WILL BE ABSENT

PLEASE FILL IN THE ABOVE, AND SCAN-TRANSMIT THIS
SHEET TO DESIGNATED SHARED FILE, BY MARCH 4 (THU),
2021. THANK YOU IN ADVANCE FOR YOUR COOPERATION.

PERSON IN CHARGE: ＊＊＊＊＊
PHONE NUMBER:○○○－XXXX－△△△△

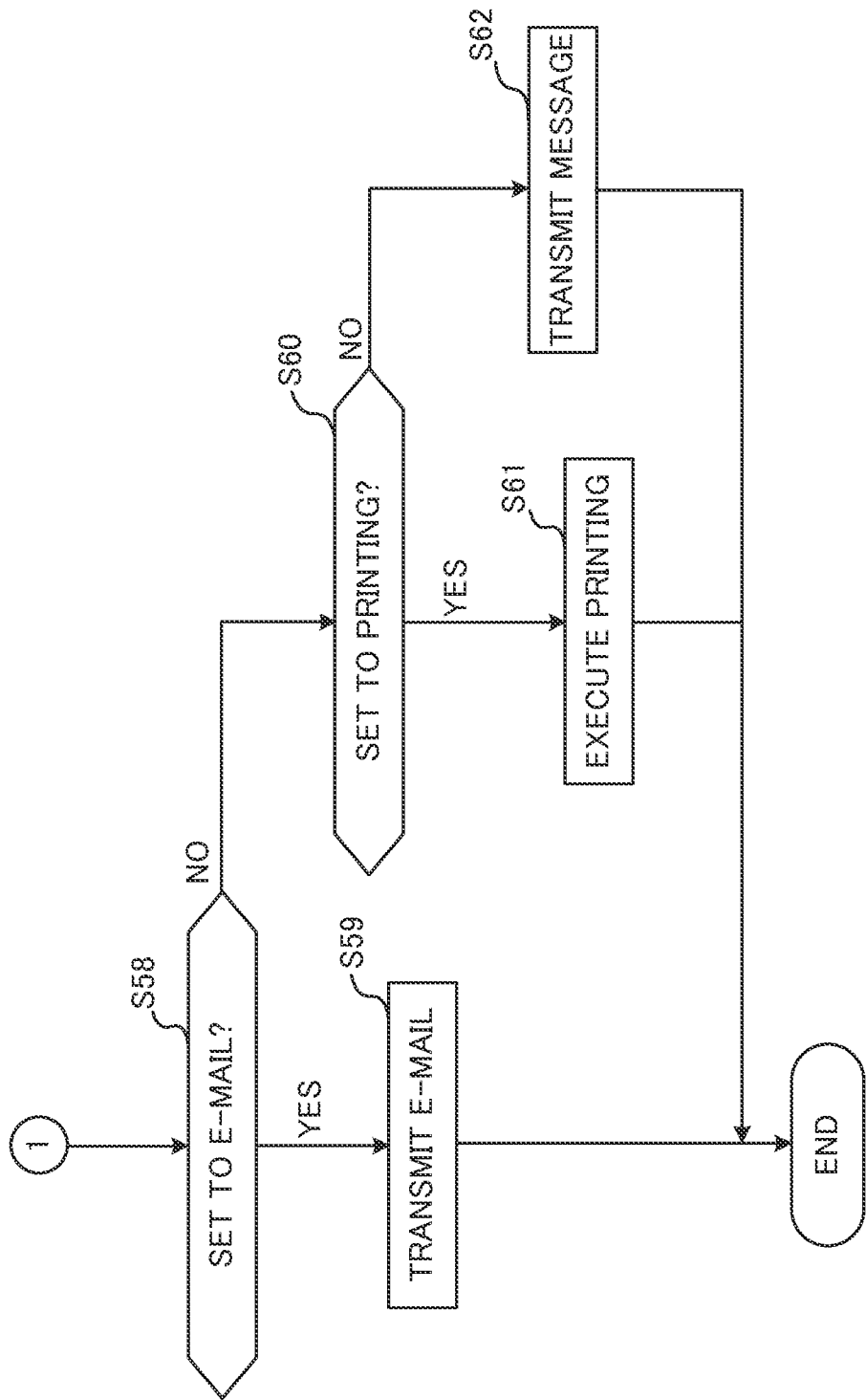

US 11,720,694 B2

IMAGE TRANSMISSION SYSTEM THAT ALLOWS TRANSMISSION OF IMAGE FILE SATISFYING PREDETERMINED CONDITION TO SHARED FOLDER, BUT RESTRICTS TRANSMISSION OF IMAGE FILE NOT SATISFYING PREDETERMINED CONDITION TO SHARED FOLDER, AND IMAGE READING APPARATUS

INCORPORATION BY REFERENCE

This application claims priority to Japanese Patent Application No. 2021-179662 filed on Nov. 2, 2021, the entire contents of which are incorporated by reference herein.

BACKGROUND

The present disclosure relates to image transmission system and an image reading apparatus, and in particular to a technique to transmit an image file to a shared folder.

Some techniques to transmit an image file to a shared folder are known. For example, a first technique, including encrypting location information of the shared folder when transmitting the same, is known. In addition, a second technique is known, including assigning authentication information to the shared folder for restricting the access thereto, and transmitting the image file to the shared folder with a password.

SUMMARY

The disclosure proposes further improvement of the foregoing techniques.

In an aspect, the disclosure provides an image transmission system including an information processing apparatus and an image reading apparatus. The information processing apparatus includes a first operation device, a first communication device, and a first controller. To the first operation device, an instruction of a user is inputted. The first communication device communicates with the image reading apparatus via a network. The first controller includes a processor and, when the processor executes a control program, generates, upon receipt of authentication information for accessing a shared folder, location information of the shared folder, and restriction information indicating a condition of an image file that can be transmitted to the shared holder, via the first operation device, an access code using the authentication information, the location information, and the restriction information, and transmits the authentication information, the location information, the restriction information, and the access code, to the image reading apparatus via the first communication device. The image reading apparatus includes a second operation device, a second communication device, an image reading device, a storage device, and a second controller. To the second operation device, an instruction of the user is inputted. The second communication device communicates with the information processing apparatus, via the network. The image reading device reads a source document and generates scanned data. The second controller includes a processor and, when the processor executes a control program, generates the image file representing an image of the source document, on a basis of the scanned data. Upon receipt of the authentication information, the location information, the restriction information, and the access code, via the second communication device, the second controller stores the authentication information, the location information, the restriction information, and the access code in the storage device, in association with one another, and transmits, via the second communication device, the image file to the shared holder indicated by the location information, using the authentication information associated with the access code, provided that the image file satisfies the condition indicated by the restriction information associated with the access code, when information indicating the access code is received via the second operation device, but keeps from transmitting the image file, when the image file does not satisfy the condition indicated by the restriction information.

In another aspect, the disclosure provides an image reading apparatus including a second operation device, a second communication device, an image reading device, a storage device, and a second controller. To the second operation device, an instruction of a user is inputted. The second communication device communicates with an information processing apparatus, via a network. The image reading device reads a source document and generates scanned data. The second controller includes a processor and, when the processor executes a control program, generates an image file representing an image of the source document, on a basis of the scanned data. Upon receipt of authentication information for accessing a shared folder, location information of the shared folder, and restriction information indicating a condition of an image file that can be transmitted to the shared holder, via the second operation device, the second controller generates an access code using the authentication information, the location information, and the restriction information, and stores the authentication information, the location information, the restriction information, and the access code in the storage device, in association with one another. The second controller transmits, via the second communication device, the image file to the shared holder indicated by the location information, using the authentication information associated with the access code, provided that the image file satisfies the condition indicated by the restriction information associated with the access code, when information indicating the access code is received via the second operation device, but keeps from transmitting the image file, when the image file does not satisfy the condition indicated by the restriction information.

BRIEF DESCRIPTION OF THE DRAWINGS

FIG. 4 is a block diagram showing an internal configuration of an information processing apparatus;

FIG. 5B is a flowchart showing the first access code generation process, subsequent to FIG. 5A;

FIG. 9 is a schematic drawing for explaining an example of an access code generation method;

FIG. 11 is a schematic drawing for explaining the example of the access code generation method;

FIG. 12 is a schematic drawing showing an example of a third input screen;

FIG. 13A is a flowchart showing an image file transmission process;

FIG. 14 is a schematic drawing showing an example of a home screen;

FIG. 17 is a schematic drawing showing an example of a source image;

FIG. 18B is a flowchart showing the second access code generation process, subsequent to FIG. 18A;

DETAILED DESCRIPTION

First Embodiment

Figure 1:
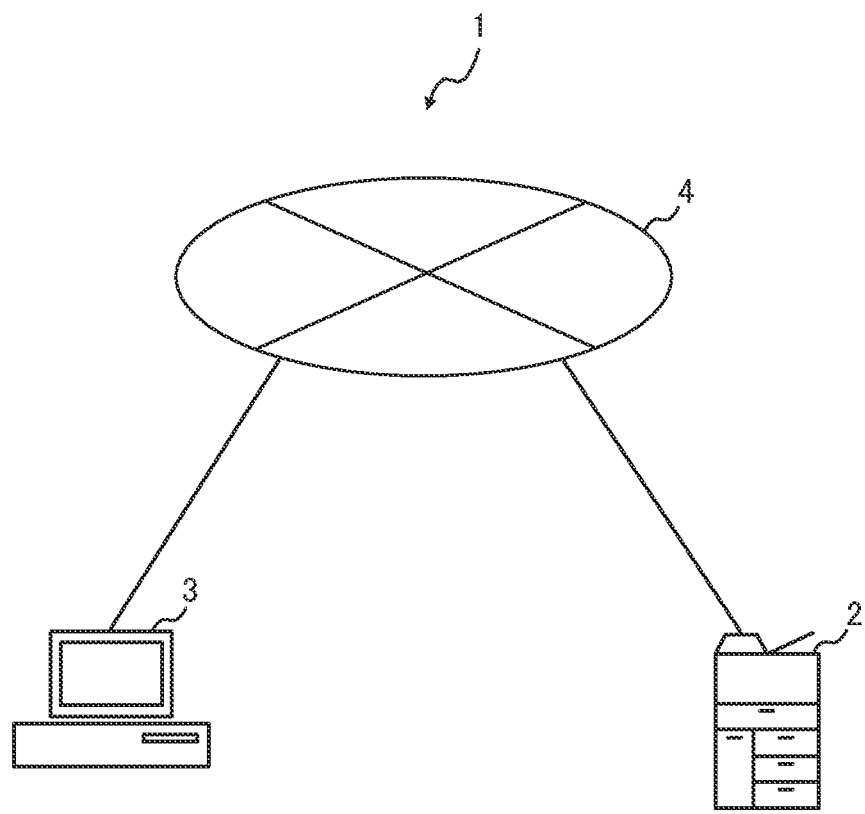
FIG. 1 is a schematic drawing showing a configuration of an image transmission system.

Hereafter, a first embodiment of the disclosure will be described, with reference to the drawings. FIG. 1 is a schematic drawing showing a configuration of an image transmission system 1 according to the first embodiment of the disclosure. As shown in FIG. 1, the image transmission system 1 includes an image forming apparatus 2 and an information processing apparatus 3. The image forming apparatus 2 and the information processing apparatus 3 are communicably connected to each other, via a network 4.

[Configuration of Image Forming Apparatus 2]

Figure 2:
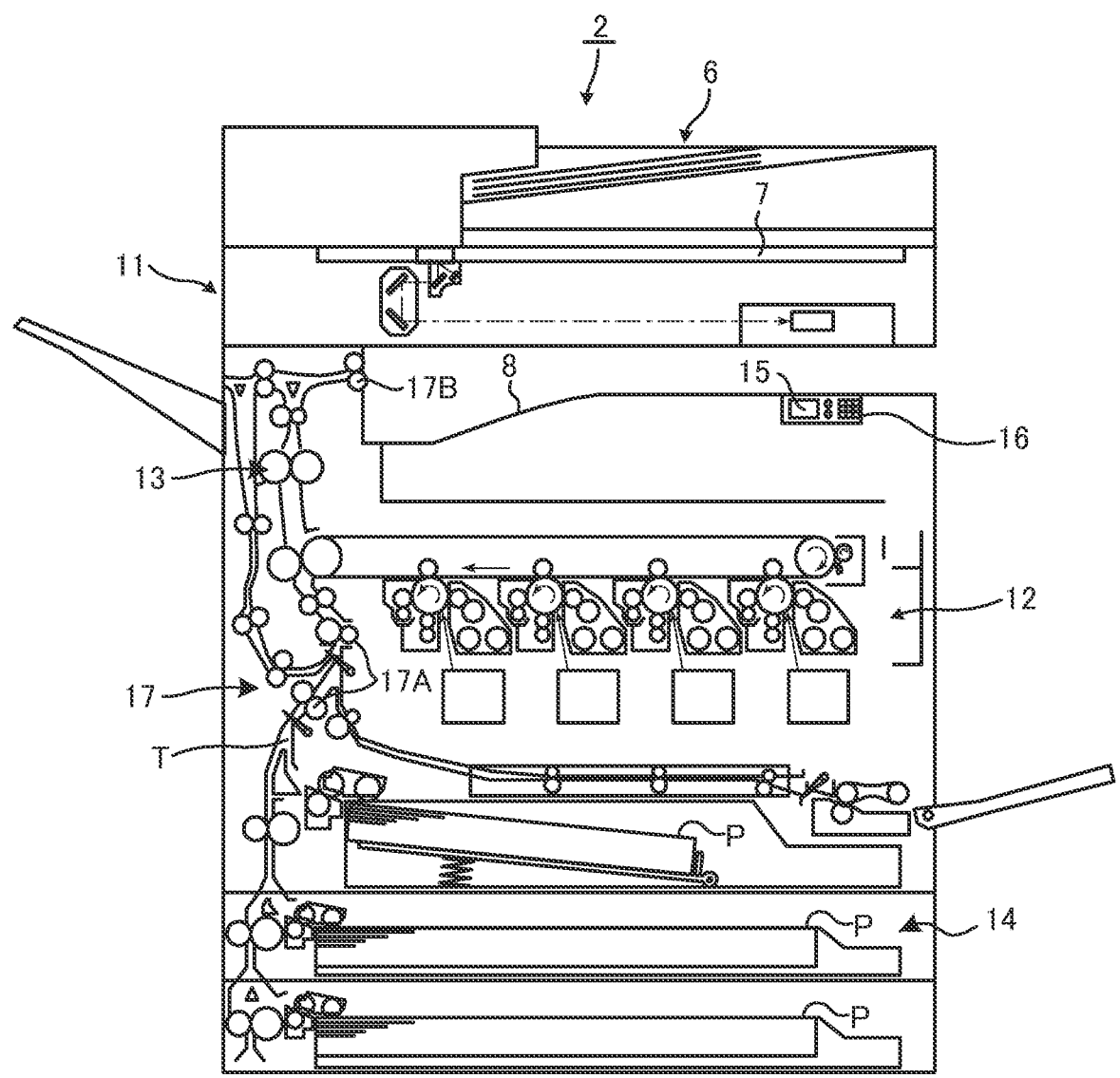
FIG. 2 is a front cross-sectional view showing a structure of an image forming apparatus.
Figure 3:
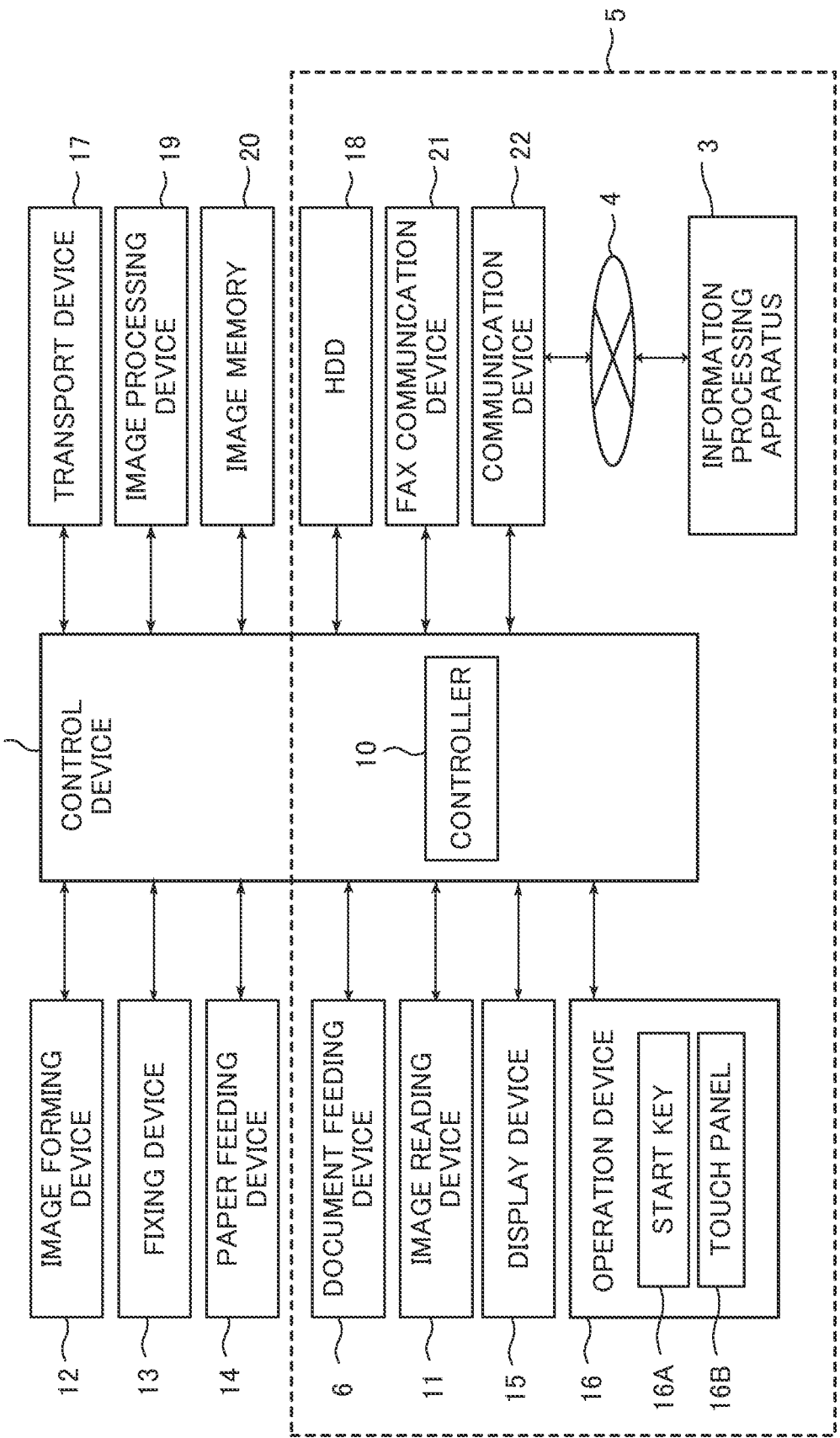
FIG. 3 is a block diagram showing an internal configuration of the image forming apparatus.

FIG. 2 is a front cross-sectional view showing a structure of the image forming apparatus 2. FIG. 3 is a block diagram showing an internal configuration of the image forming apparatus 2. Referring to FIG. 2 and FIG. 3, the image forming apparatus 2 is a color multifunction peripheral having a plurality of functions, such as copying, transmitting, printing, and facsimile transmission.

In the casing of the image forming apparatus 2, as shown in FIG. 2, a plurality of components for realizing various functions of the image forming apparatus 2 are provided. For example, an image reading device 11, an image forming device 12, a fixing device 13, a paper feeding device 14, and a transport device 17 are provided inside the casing. On the front face of the casing, a display device 15 and an operation device 16 are provided.

The image reading device 11 is configured as an automatic document feeder (ADF) including a document feeding device 6 that delivers a source document placed on a document table, and a scanner that optically reads the source document, delivered from the document feeding device 6 or placed on a platen glass 7. The image reading device 11 reads the image of the source document, by emitting light from a light emitting device to the source document and receiving the reflected light with a charge-coupled device (CCD) sensor, and generates scanned data representing the detection result from the CCD sensor.

The image forming device 12 includes a photoconductor drum, a charging device, an exposure device, a development device, and a transfer device. The image forming device 12 forms an image constituted of a toner image on a recording sheet P, transported by the transport device 17 along a transport route T, on the basis of the scanned data generated by the document reading device 11, or an image file inputted through the communication device 22.

The fixing device 13 heats and presses the recording sheet P on which the toner image has been formed by the image forming device 12, to thereby fix the toner image onto the recording sheet P The recording sheet P on which the toner image has been fixed by the fixing device 13 is delivered to an output tray 8.

The paper feeding device 14 includes a manual bypass tray, and a plurality of paper cassettes. The paper feeding device 14 draws out the recording sheets P stored in one of the plurality of paper cassettes, or the recording sheets placed on the manual bypass tray, one by one with a pickup roller, and delivers the recording sheet P to the transport route T.

The display device 15 is, for example, constituted of an LCD or an organic light-emitting diode (OLED) display. The display device 15 displays various types of screens related to the functions that the image forming apparatus 2 is configured to perform.

The operation device 16 includes a plurality of hard keys, such as a start key 16A for instructing the start of one of the functions that the image forming apparatus 2 is configured to perform. The operation device 16 also includes a touch panel 16B overlaid on the display device 15. Through the operation device 16, a user's instruction to execute the function is inputted. The operation device 16 exemplifies the second operation device in the disclosure.

The transport device 17 includes a transport roller pair 17A, a delivery roller pair 17B, and a transport motor connected to the transport roller pair 17A and the delivery roller pair 17B. When the transport motor drives the transport roller pair 17A and the delivery roller pair 17B so as to rotate, the recording sheet P delivered from the paper feeding device 14 is transported along the transport route T, toward the image forming device 12 and then to the output tray 8.

Referring to FIG. 3, the image forming apparatus 2 includes a control device 100. The control device 100 includes a processor, a random-access memory (RAM), a read-only memory (ROM), and so forth. The processor is, for example, a central processing unit (CPU), a micro processing unit (MPU), or an application specific integrated circuit (ASIC). The control device 100 acts as a controller 10, when the processor executes a control program stored in the ROM or a hard disk drive (HDD) 18.

The controller 10 serves to control the overall operation of the image forming apparatus 2. To be more detailed, the controller 10 controls the operation of each of the components of the image forming apparatus 2, and communication with the information processing apparatus 3 connected via the network 4. For example, the controller 10 generates the image file representing the source image, on the basis of the scanned data. Here, the image file refers to the data obtained by converting the scanned data into a specific format (file format). The controller 10 may be constituted of a logic circuit, instead of being realized by the operation according to the control program. The controller 10 exemplifies the second controller in the disclosure.

The control device 100 is electrically connected to the document feeding device 6, the image reading device 11, the image forming device 12, the fixing device 13, the paper feeding device 14, the display device 15, the operation device 16, the transport device 17, the HDD 18, an image processing device 19, an image memory 20, a facsimile communication device 21, and a communication device 22. The controller 10, the document feeding device 6, the image reading device 11, the display device 15, the operation device 16, the HDD 18, the facsimile communication device 21, and the communication device 22 of the control device 100 act as the image reading apparatus 5.

The HDD 18 is a large-capacity storage device for storing various types of data, such as the image file. In the HDD 18, various control programs, for realizing the basic functions that the image forming apparatus 2 is configured to perform, are stored. Examples of the control programs stored in the HDD 18 include a storage program for executing an access code storage process according to the first embodiment, and a transmission program for executing an image file transmission process according to the first embodiment. The HDD 18 exemplifies the storage device in the disclosure.

Another example of the control program stored in the HDD 18 is an optical character recognition (OCR) program, for executing the known OCR process. The controller 10 recognizes characters contained in the image represented by the image file, by operating according to the OCR program.

The image processing device 19 executes, as necessary, the image processing to the scanned data generated by the image reading device 11. The image memory 20 includes a region for temporarily storing the scanned data generated by the image reading device 11. The facsimile communication device 21 makes connection to the public telephone line, and transmits and receives the scanned data via the public telephone line.

The communication device 22 includes a communication module such as a local area network (LAN) board. The communication device 22 performs data communication via the network 4, with an external apparatus such as the information processing apparatus 3. The communication device 22 exemplifies the second communication device in the disclosure.

A power source is provided for each of the components of the image forming apparatus 2, so that those components are activated with the power supplied from the power source.

[Configuration of Information Processing Apparatus 3]

FIG. 4 is a block diagram showing an internal configuration of the information processing apparatus 3. The information processing apparatus 3 is, for example, a personal computer (PC). As shown in FIG. 4, the information processing apparatus 3 includes a control device 300, an operation device 31, a display device 32, an HDD 33, and a communication device 34. The control device 300 includes a processor, a RAM, a ROM, and so forth. The processor is, for example, a CPU, an MPU, or an ASIC.

The control device 300 acts as a controller 30, when the processor executes a control program stored in the ROM or the HDD 33. The controller 30 serves to control the overall operation of the information processing apparatus 3. To be more detailed, the controller 30 controls the operation of each of the components of the information processing apparatus 3, and the communication with the image forming apparatus 2 connected via the network 4. Here, the controller 30 may be constituted of a logic circuit, instead of being realized by the operation according to the control program.

The operation device 31 includes a keyboard for inputting characters, and a mouse serving as the pointing device. The user can input, through the operation device 31, various instructions related to the functions that the information processing apparatus 3 is configured to perform. The operation device 31 exemplifies the first operation device in the disclosure.

The display device 32 is, for example, constituted of an LCD or an OLED display. The display device 32 displays various types of screens related to the functions that the information processing apparatus 3 is configured to perform.

The HDD 33 is a large-capacity storage device for storing various types of data, such as the image file. In the HDD 33, various control programs, for realizing the basic functions that the information processing apparatus 3 is configured to perform, are stored. Examples of the control programs stored in the HDD 33 include a first generation program for executing a first access code generation process according to the first embodiment.

The communication device 34 includes a communication module such as a local area network (LAN) board. The communication device 34 performs data communication via the network 4, with an external apparatus such as the image forming apparatus 2. The communication device 34 exemplifies the first communication device in the disclosure.

A power source is provided for each of the components of the information processing apparatus 3, so that those components are activated with the power supplied from the power source.

In the first embodiment, the controller 30 of the information processing apparatus 3 executes a first access code generation process, by operating according to the first generation program. The first access code generation process includes generating, upon receipt of authentication information for accessing a shared folder, location information of the shared folder, and restriction information indicating a condition of the image file that can be transmitted to the shared folder, via the operation device 31, an access code using the authentication information, the location information, and the restriction information, and transmitting first information including the authentication information, the location information, the restriction information, and the access code, to the image forming apparatus 2 via the communication device 34.

In the first embodiment, the controller 10 of the image forming apparatus 2 executes, by operating according to the storage program, an access code storage process including storing the authentication information, the location information, the restriction information, and the access code, indicated by the first information, in the HDD 18 in association with one another, upon receipt of the first information via the communication device 22. The controller 10 also executes an image file transmission process, by operating according to the transmission program. The image file transmission process includes transmitting, via the communication device 22, the image file to the shared folder indicated by the location information, using the authentication information associated with the access code, provided that the image file satisfies the condition indicated by the restriction information associated with the access code, when a character string representing the access code is received via the touch panel 16B, but keeping from transmitting the image file, when the image file does not satisfy the condition indicated by the restriction information.

[Operation]

[1] Operation of Information Processing Apparatus 3

Figure 5A:
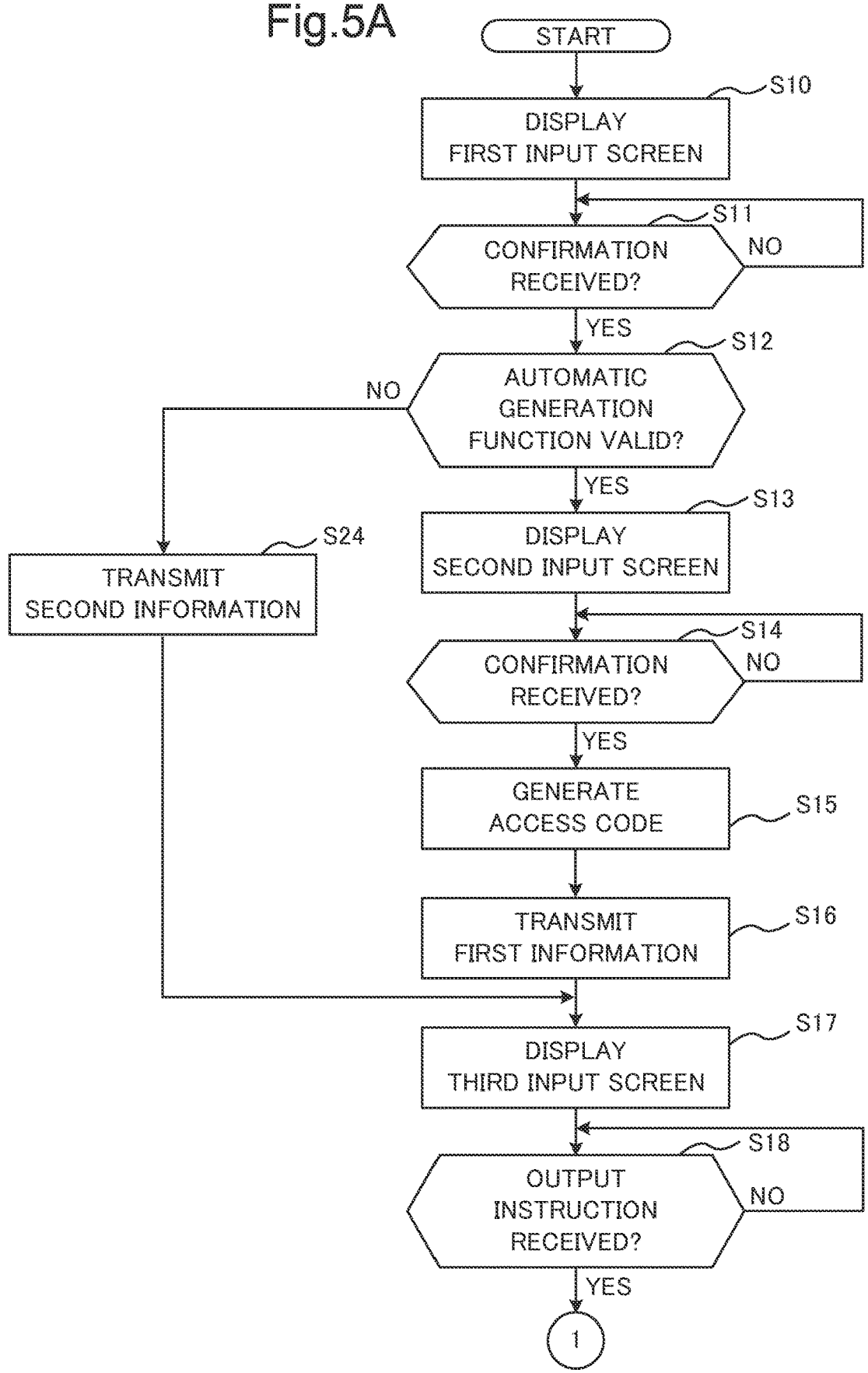
FIG. 5A is a flowchart showing a first access code generation process.
Figure 6:
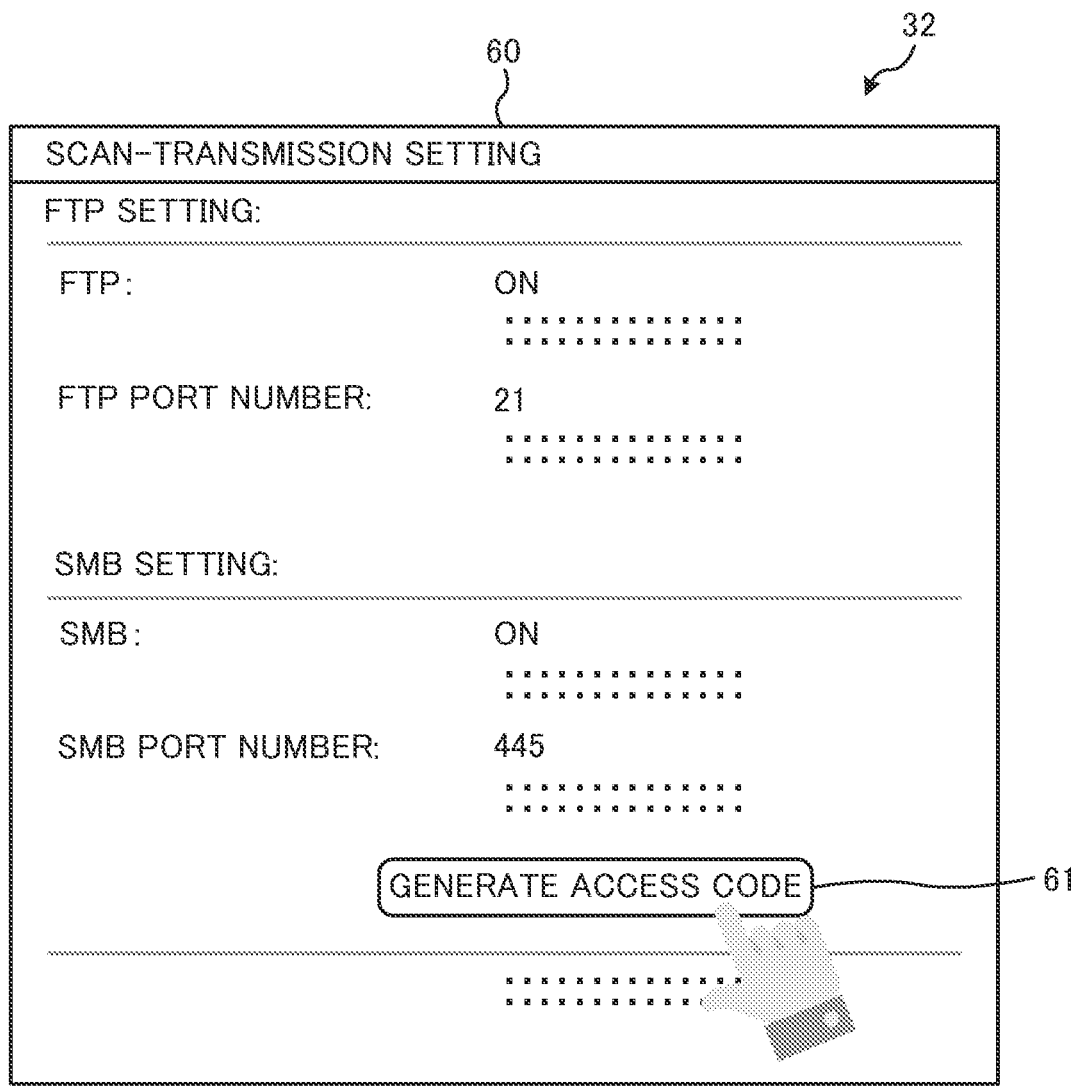
FIG. 6 is a schematic drawing showing an example of a first setup screen.
Figure 7:
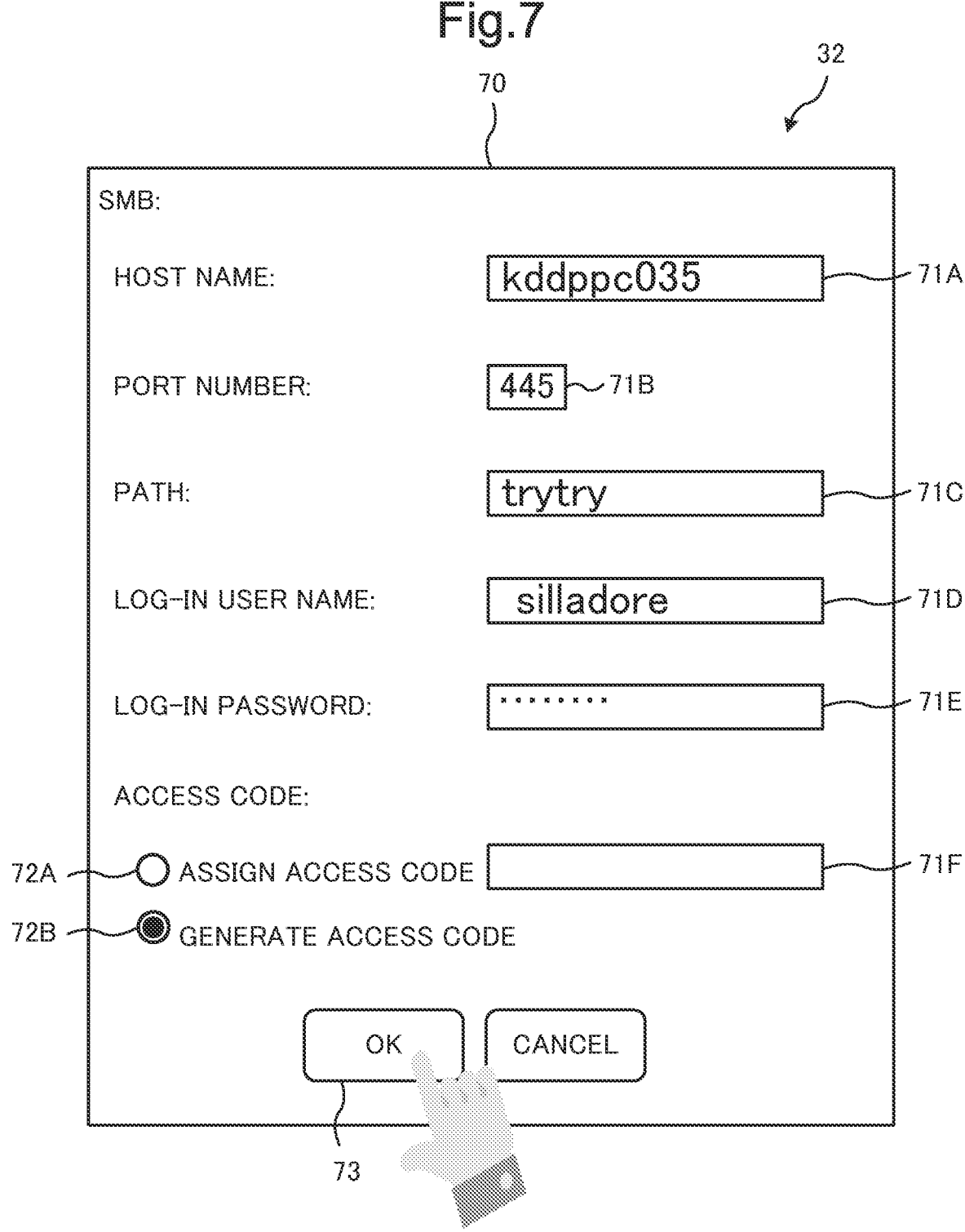
FIG. 7 is a schematic drawing showing an example of a first input screen.
Figure 8:
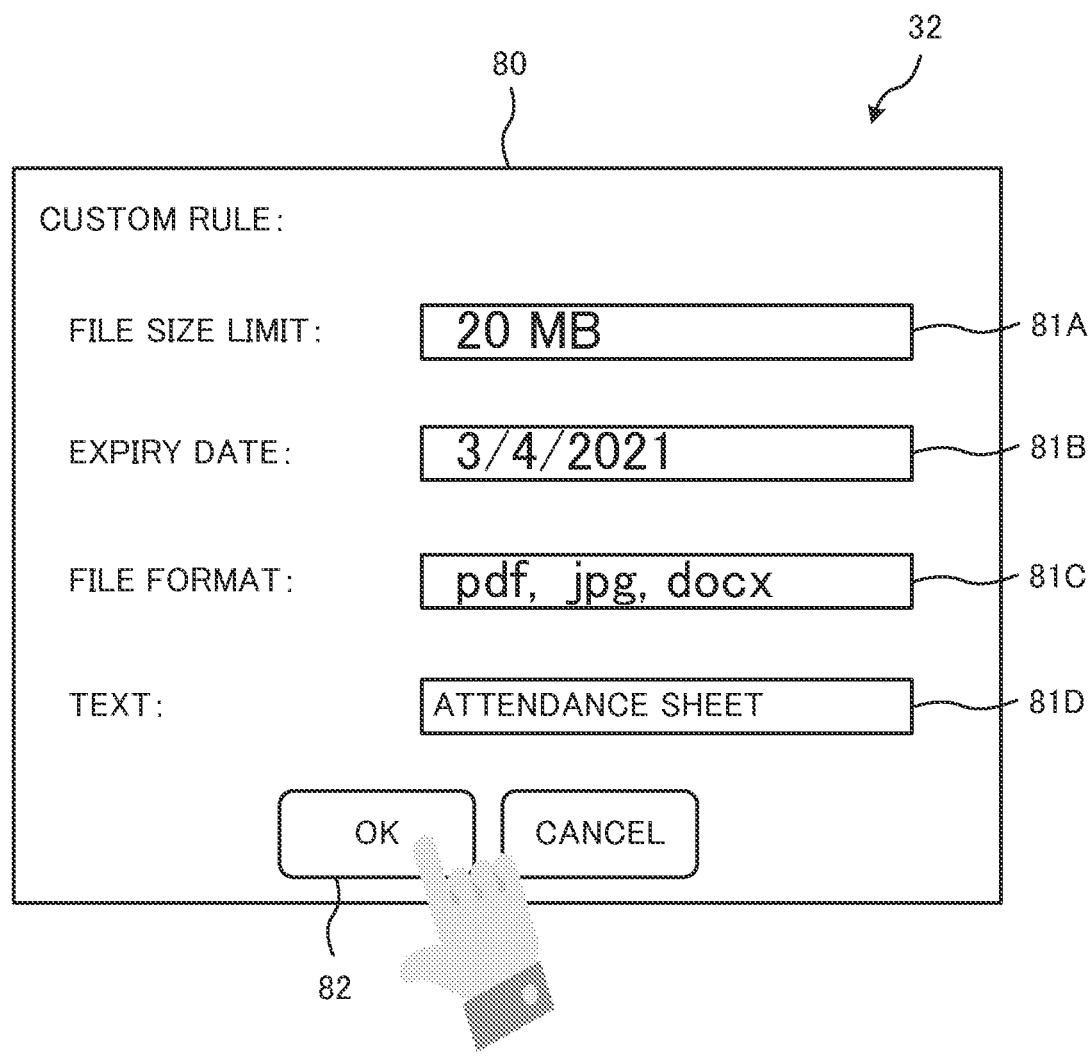
FIG. 8 is a schematic drawing showing an example of a second input screen.
Figure 10:
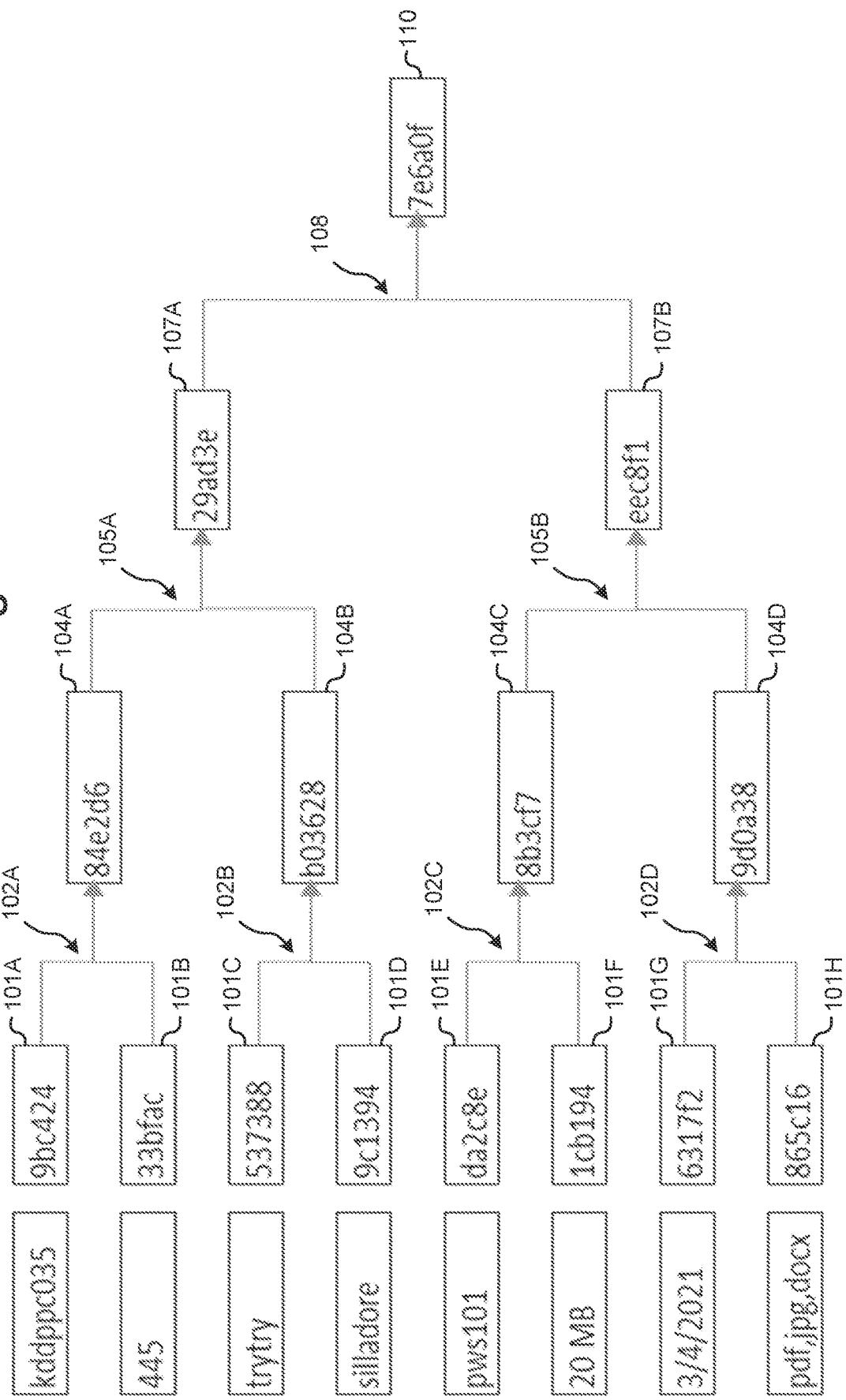
FIG. 10 is a schematic drawing for explaining the example of the access code generation method.

FIG. 5A and FIG. 5B are flowcharts each showing the first access code generation process. FIG. 6 illustrates an example of a first setup screen. FIG. 7 illustrates an example of a first input screen. FIG. 8 illustrates an example of a second input screen. FIG. 9 to FIG. 11 each illustrate an example of an access code generation method. FIG. 12 illustrates an example of a third input screen.

Referring to FIG. 5A to FIG. 12, an operation performed by the information processing apparatus 3 to execute the first access code generation process will be described hereunder. For the following description, it is assumed that the power to the information processing apparatus 3 is turned on.

A first user, the organizer of a meeting, is intending to set up a shared folder, using his/her own information processing apparatus 3, for preserving an attendance sheet transmitted from each of a plurality (e.g., 30 persons) of second users. To start with, the first user inputs, through the operation device 31, an instruction to display the first setup screen related to a scan-transmission function for transmitting the image file to the shared folder. When the operation device 31 detects that the display instruction has been inputted, the controller 30 causes the display device 32 to display the first setup screen 60 shown in FIG. 6. Then the first user selects a key 61 in the first setup screen 60, through the operation device 31.

When the operation device 31 detects that the key 61 has been selected, the controller 30 starts to execute the first access code generation process shown in FIG. 5A and FIG. 5B, and causes the display device 32 to display the first input screen 70 shown in FIG. 7, through which the authentication information and the location information are to be inputted (step S10). After step S10, the controller 30 repeats deciding that definite confirmation of the inputted detail has not been made, until the operation device 31 detects that a key 73 in the first input screen 70 has been selected (NO at step S11).

In view of the first input screen 70, the first user inputs, through the operation device 31, for example a host name "kddppc035", a port number "445", and a path "trytry" as the location information, and a log-in user name "silladore" and a log-in password "pws101" as the authentication information. When the operation device 31 detects that the location information and the authentication information have been inputted, the controller 30 causes the display device 32 to display the location information and the authentication information inputted as above in fields 71A to 71F, among which only the log-in password is concealed.

[1-1] When Access Code Automatic Generation Function is Valid

After inputting the location information and the authentication information, the first user selects a checkbox 72B, through the operation device 31. When the operation device 31 detects that the checkbox 72B has been selected, the controller 30 causes the display device 32 to display a checkmark in the checkbox 72B, and validates the automatic generation function of the access code. After selecting the checkbox 72B, the first user selects the key 73, through the operation device 31.

When the operation device 31 detects that the key 73 has been selected, the controller 30 decides that the definite confirmation has been made (YES at step S11), and decides whether the automatic generation function of the access code has been validated (step S12). In this case, the controller 30 decides that the automatic generation function of the access code has been validated (YES at step S12), and causes the display device 32 to display the second input screen 80 shown in FIG. 8, through which the restriction information is to be inputted (step S13).

After step S13, the controller 30 repeats deciding that definite confirmation of the inputted detail has not been made, until the operation device 31 detects that a key 82 in the second input screen 80 has been selected (NO at step S14). In view of the second input screen 80, the first user inputs, through the operation device 31, an upper limit of the file size "20 MB", an expiry date "Mar. 4, 2021", a file format "pdf, jpg, docx", and a character string "Attendance Sheet", as the restriction information.

When the operation device 31 detects that such restriction information has been inputted, the controller 30 causes the display device 32 to display the restriction information inputted as above in fields 81A to 81D. After inputting the restriction information, the first user selects the key 82, through the operation device 31. When the operation device 31 detects this selection, the controller 30 decides that the definite confirmation has been made (YES at step S14), and generates the access code, from the authentication information, the location information, and the restriction information inputted as above (step S15).

Referring now to FIG. 9 to FIG. 11, an example of an access code generation method will be described hereunder. First, the controller 30 calculates eight hash values shown in FIG. 9, by calculating the hash value using a predetermined hash function (in this case, MD5), with respect to each of the host name, the port number, the path, the log-in user name, the log-in password, the upper limit of the file size, the expiry date, and the file format that have been inputted.

Then the controller 30 repeatedly executes four processes, namely a first process including acquiring a first numerical value of a predetermined number of digits (in this case, 6 digits), with respect to each of the calculated hash values, a second process including generating a combination composed of a predetermined number (in this case, two) of the first numerical values according to a predetermined rule (in this case, order of acquisition of the first numerical value), a third process including connecting the first numerical values composing the generated combination, thereby generating a second numerical value, and a fourth process including calculating a hash value from the second numerical value, using a predetermined hash function (in this case, MD5), until the number of first numerical values becomes one.

To be more detailed, the controller 30 executes the first process with respect to the eight hash values calculated as above, thereby acquiring the first numerical values 101A to 101H, as shown in FIG. 9. The controller 30 then executes the second process with respect to the first numerical values 101A to 101H, thereby generating a combination 102A of the first numerical values 101A and 101B, a combination 102B of the first numerical values 101C and 101D, a combination 102C of the first numerical values 101E and 101F, and a combination 102D of the first numerical values 101G and 101H, as shown in FIG. 10. The controller 30 further executes the third process with respect to the combinations 102A to 102D, thereby acquiring the second numerical values 103A to 103D, as shown in FIG. 11. Then the controller 30 executes the fourth process with respect to the second numerical values 103A to 103D, thereby calculating four hash values shown in FIG. 11.

The controller 30 executes the first process with respect to the four hash values calculated as above, thereby acquiring the first numerical values 104A to 104D shown in FIG. 11. The controller 30 then executes the second process with respect to the first numerical values 104A to 104D, thereby generating a combination 105A of the first numerical values 104A and 104B, and a combination 105B of the first numerical values 104C and 104D, as shown in FIG. 10. The controller 30 further executes the third process with respect to the combinations 105A and 105B, thereby acquiring the second numerical values 106A and 106B, as shown in FIG. 11. Then the controller 30 executes the fourth process with respect to the second numerical values 106A and 106B, thereby calculating two hash values shown in FIG. 11.

Further, the controller 30 executes the first process with respect to the two hash values calculated as above, thereby acquiring the first numerical values 107A and 107B shown in FIG. 11. The controller 30 then executes the second process with respect to the first numerical values 107A and 107B, thereby generating a combination 108 of the first numerical values 107A and 107B, as shown in FIG. 10. The controller 30 further executes the third process with respect to the combination 108, thereby acquiring the second numerical value 109 shown in FIG. 11. Then the controller 30 executes the fourth process with respect to the second numerical value 109, thereby calculating one hash value shown in FIG. 11.

The controller 30 executes the first process with respect to the hash value calculated as above, thereby acquiring the first numerical value 110 shown in FIG. 11. At this point, a single first numerical value 110 has been acquired as shown in FIG. 10, and therefore the controller 30 finishes the repetition of the first process to the fourth process, and acquires the first numerical value 110 "7e6a0f" finally determined, as the access code.

After step S15, the controller 30 transmits the first information including the authentication information, the location information, and the restriction information inputted, and the access code generated as above, to the image forming apparatus 2 via the communication device 34 (step S16). After step S16, the controller 30 causes the display device 32 to display the third input screen 120 as shown in FIG. 12, through which an output method of the access code is to be inputted (step S17).

At this point, the controller 30 causes the display device 32 to also display the access code, in a predetermined region 121 of the third input screen 120. After step S17, the controller 30 repeats deciding that an instruction to output the access code has not been received (NO at step S18), until the operation device 31 detects that a key 126 in the third input screen 120 has been selected.

[1-1-1] When "E-Mail" is Designated

In view of the third input screen 120, the first user inputs a plurality of e-mail addresses respectively owned by the plurality of second users, through the operation device 31. When the operation device 31 detects that the plurality of e-mail addresses have been inputted, the controller 30 causes the display device 32 to display the plurality of e-mail addresses inputted, in a field 123.

After inputting the e-mail addresses, the first user selects a checkbox 122B, through the operation device 31. When the operation device 31 detects that the checkbox 122B has been selected, the controller 30 causes the display device 32 to display a checkmark in the checkbox 122B, and sets the output method of the access code to "E-Mail".

The first user further inputs, through the operation device 31, a character string "ABCDNET¥Attendance Sheet", indicating a storage location of an original image file representing an image of "Attendance Sheet" which is an original source document. When the operation device 31 detects that the mentioned storage location has been inputted, the controller 30 causes the display device 32 to display the inputted storage location in a field 125. After inputting the storage location, the first user selects a key 126 through the operation device 31.

When the operation device 31 detects that the key 126 has been selected, the controller 30 decides that the output instruction has been received (YES at step S18), and that the output method of the access code has been set to "E-Mail" (YES at step S19), and transmits an e-mail indicating the generated access code and the inputted storage location, to the corresponding e-mail address via the communication device 34 (step S20). After step S20, the controller 30 finishes the first access code generation process.

[1-1-2] When "Printing" is Designated

In view of the third input screen 120, the first user selects a checkbox 122A, through the operation device 31. When the operation device 31 detects that the checkbox 122A has been selected, the controller 30 causes the display device 32 to display the checkmark in the checkbox 122A, and sets the output method of the access code to "Printing".

The first user further inputs, through the operation device 31, the storage location of the original image file representing the image of the original source document, in the same way as above. When the operation device 31 detects that the mentioned storage location has been inputted, the controller 30 causes the display device 32 to display the inputted storage location in the field 125. After inputting the storage location, the first user selects the key 126 through the operation device 31.

When the operation device 31 detects that the key 126 has been selected, the controller 30 decides that the output instruction has been received (YES at step S18), and that the output method of the access code has not been set to "E-Mail" (NO at step S19), but to "Printing" (YES at step S19), and generates the image file representing the image including the generated access code and the inputted storage location. Then the controller 30 transmits the generated image file to the image forming apparatus 2, together with the printing instruction, via the communication device 34 (step S22).

Upon receipt of the image file and the printing instruction via the communication device 22, the controller 10 of the image forming apparatus 2 causes the image forming device 12 to record the image represented by the image file received, on the recording sheet P After step S22, the controller 30 finishes the first access code generation process.

[1-1-3] When "Short Message" is Designated

In view of the third input screen 120, the first user inputs a plurality of telephone numbers respectively owned by the plurality of second users, through the operation device 31. When the operation device 31 detects that the plurality of telephone numbers have been inputted, the controller 30 causes the display device 32 to display the plurality of telephone numbers inputted, in a field 124.

After inputting the telephone numbers, the first user selects a checkbox 122C, through the operation device 31. When the operation device 31 detects that the checkbox 122C has been selected, the controller 30 causes the display device 32 to display the checkmark in the checkbox 122C, and sets the output method of the access code to "Short Message".

The first user further inputs, through the operation device 31, the storage location of the original image file representing the image of the original source document, in the same way as above. When the operation device 31 detects that the mentioned storage location has been inputted, the controller 30 causes the display device 32 to display the inputted storage location in the field 125. After inputting the storage location, the first user selects the key 126 through the operation device 31.

When the operation device 31 detects that the key 126 has been selected, the controller 30 decides that the output instruction has been received (YES at step S18), and that the output method of the access code has been neither set to "E-Mail" nor "Printing" (NO at step S19 and step S21), but to "Short Message", and transmits the short message indicating the generated access code and the inputted storage location to the telephone numbers inputted, via the facsimile communication device 21 (step S23). After step S23, the controller 30 finishes the first access code generation process.

[1-2] When Access Code Automatic Generation Function is Invalid

After inputting the location information and the authentication information, the first user selects a checkbox 72A shown in FIG. 7, through the operation device 31. When the operation device 31 detects that the checkbox 72A has been selected, the controller 30 causes the display device 32 to display the checkmark in the checkbox 72A, and invalidates the automatic generation function of the access code. After selecting the checkbox 72A, the first user inputs an optionally determined access code, through the operation device 31.

When the operation device 31 detects that the access code has been inputted, the controller 30 causes the display device 32 to display the inputted access code, in a field 71F. After inputting the access code, the first user selects the key 73, through the operation device 31. When the operation device 31 detects that the key 73 has been selected, the controller 30 decides that the definite confirmation has been made (YES at step S11), and proceeds to step S12.

In this case, the controller 30 decides that the automatic generation function of the access code is not validated (NO at step S12), and transmits second information including the authentication information, the location information, and the access code that have been inputted, to the image forming apparatus 2 via the communication device 34, instead of causing the display device 32 to display the second input screen 80 (step S24). After step S24, the controller 30 proceeds to step S17.

[2] Operation of Image Forming Apparatus 2

[2-1] When Executing Access Code Storage Process

When the power to the image forming apparatus 2 is turned on, the controller 10 starts to execute the access code storage process, and stands by for the receipt of the first information or the second information, via the communication device 22. Upon receipt of the first information via the communication device 22, the controller 10 stores the authentication information, the location information, the restriction information, and the access code included in the first information, in the HDD 18 in association with one another. In contrast, upon receipt of the second information via the communication device 22, the controller 10 stores the authentication information, the location information, and the access code included in the second information, in the HDD 18 in association with one another.

(2-2) When Executing Image File Transmission Process

Figure 13B:
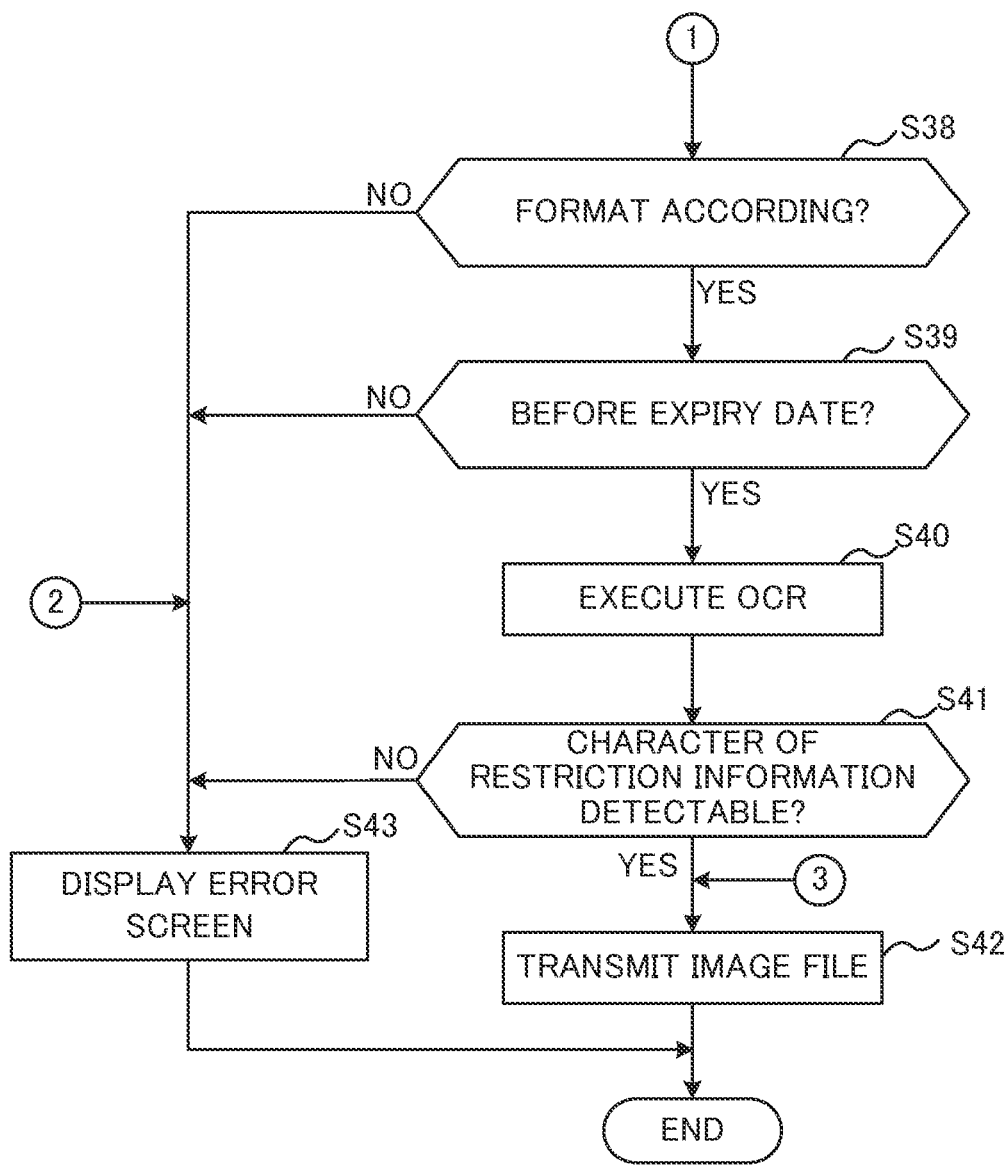
FIG. 13B is a flowchart showing the image file transmission process, subsequent to FIG. 13A.
Figure 15:
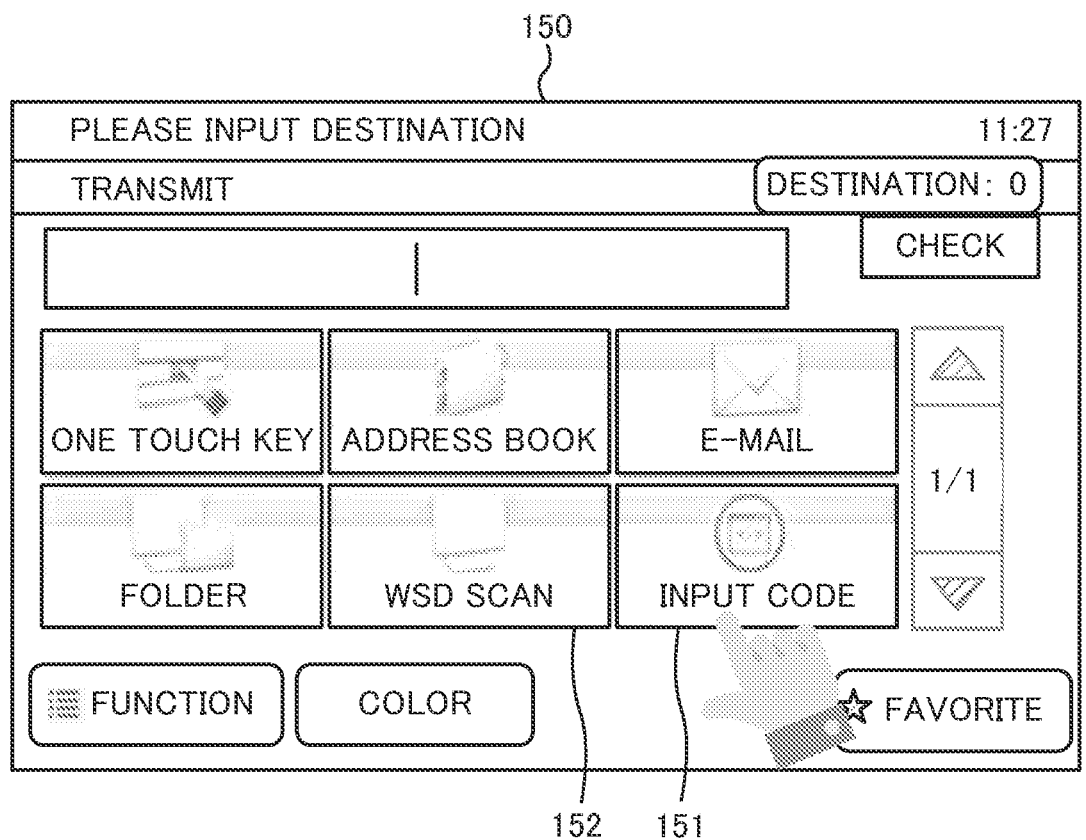
FIG. 15 is a schematic drawing showing an example of a second setup screen.
Figure 16:
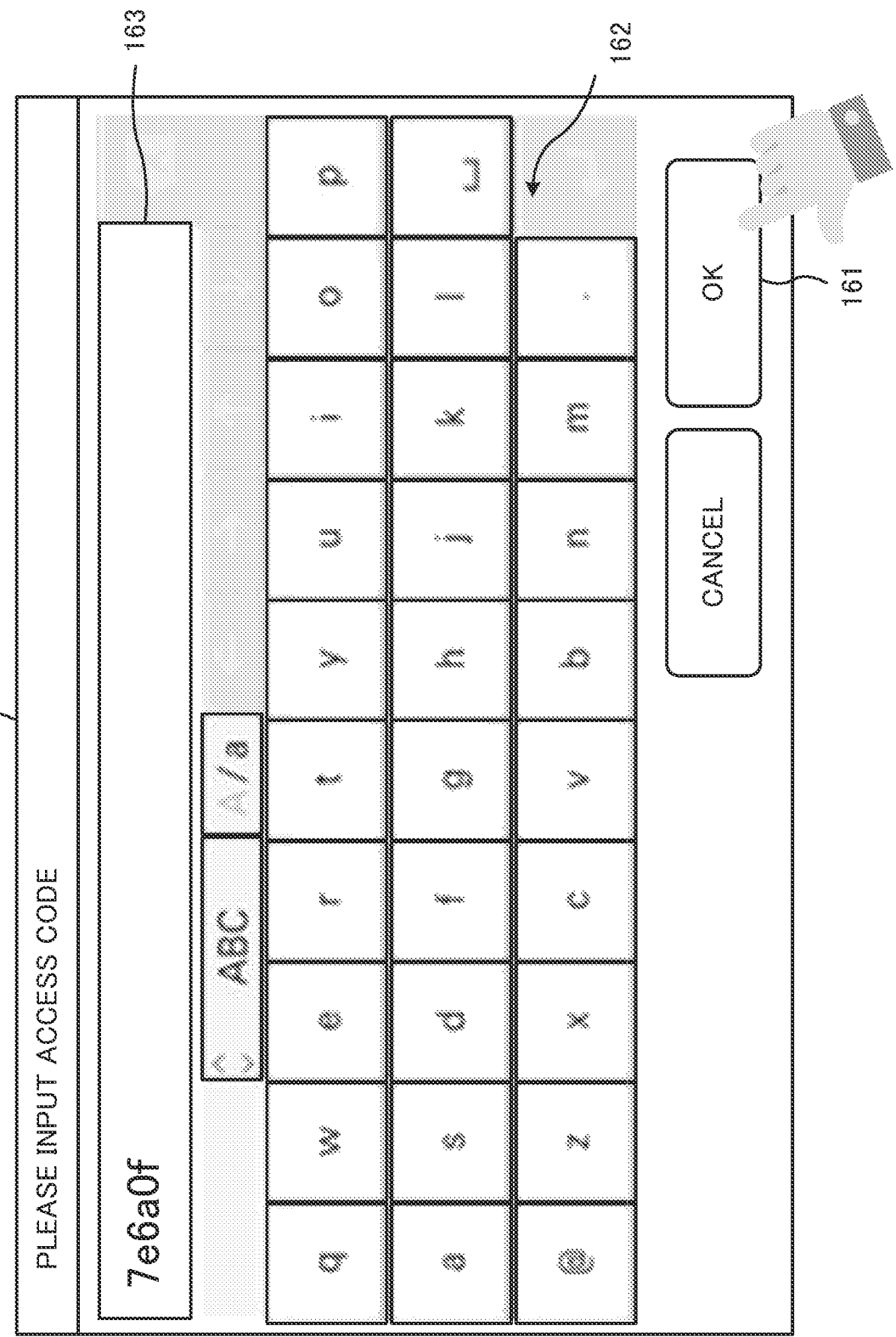
FIG. 16 is a schematic drawing showing an example of a fourth input screen.

FIG. 13A and FIG. 13B are flowcharts each showing the image file transmission process. FIG. 14 illustrates an example of a home screen. FIG. 15 illustrates an example of a second setup screen. FIG. 16 illustrates an example of a fourth input screen. FIG. 17 illustrates an example of the source image. Referring to FIG. 13A to FIG. 17, an operation performed by the image forming apparatus 2 to execute the image file transmission process will be described hereunder.

When the power to the image forming apparatus 2 is turned on, the controller 10 causes the display device 15 to display the home screen 140 shown in FIG. 14. The second user, who has acquired the access code, for example with his/her own mobile terminal via the e-mail, touches a key 141 in the home screen 140 to select the scan-transmission function, on Mar. 1, 2021. When the touch panel 16B detects that the key 141 has been touched, the controller 10 causes the display device 15 to display the second setup screen 150 shown in FIG. 15, through which the destination of the scanned image is to be set.

When the second user touches a key 151 in the second setup screen 150, the touch panel 16B detects that the key 151 has been touched, and the controller 10 starts to execute the image file transmission process shown in FIG. 13A and FIG. 13B, and causes the display device 15 to display the fourth input screen 160 shown in FIG. 16, through which the access code is to be inputted (step S30).

After step S30, the controller 10 repeats deciding that the definite confirmation has not been made (NO at step S31), until the touch panel 16B detects that a key 161 in the fourth input screen 160 is touched. The second user inputs a character string representing the access code "7e6a0f" acquired from the first user, through a software keyboard 162 in the fourth input screen 160.

When the touch panel 16B detects that the mentioned character string has been inputted, the controller 10 causes the display device 15 to display the inputted character string, in a field 163. After inputting the character string, the second user touches the key 161. When the touch panel 16B detects that the key 161 has been touched, the controller 10 decides that the definite confirmation has been made (YES at step S31), and decides whether the access code associated with the inputted character string is stored in the HDD 18 (step S32).

Here, it is assumed that the access code "7e6a0f" included in the first information is stored in the HDD 18. Accordingly, the controller 10 decides that the access code associated with the inputted character string is stored in the HDD 18 (YES at step S32), and repeats deciding that an instruction to read the source document has not been received (NO at step S33), until the operation device 16 detects that the start key 16A has been pressed.

The second user places the source document on the document table of the image reading device 11, designates the file size "2 MB" and the file format "PDF" through the operation device 16, and presses the start key 16A. When the operation device 16 detects that the start key 16A has been pressed, the controller 10 decides that the reading instruction has been received (YES at step S33), and causes the image reading device 11 to read the source document and generate the scanned data (step S34).

After step S34, the controller 10 generates the image file of the designated file size (i.e., "2 MB") and the file format (i.e., "PDF"), on the basis of the generated scanned data (step S35). Here, it is assumed that the controller 10 has generated the image file representing the source image 170 shown in FIG. 17. The source image 170 represents the image of the original source document according to the original image file acquired from the storage location, and on which the name of the second user, and whether the second user will attend the meeting, are written by the second user.

After step S35, the controller 10 decides whether the restriction information associated with the inputted access code is stored in the HDD 18 (step S36). In this case, since the restriction information associated with the access code "7e6a0f" is stored in the HDD 18, the controller 10 decides that the restriction information is stored in the HDD 18 (YES at step S36), and decides whether the size of the generated image file is equal to or smaller than the upper limit of the file size indicated by the restriction information (step S37).

In this case, since the size of the generated image file is "2 MB", which is smaller than "20 MB" indicated by the restriction information, the controller 10 decides that the size of the image file is smaller than the upper limit (YES at step S37), and then decides whether the format of the generated image file accords with the format indicated by the restriction information (step S38).

In this case, since the format of the generated image file is "PDF", which accords with one of the formats "pdf, jpg, docx" indicated by the restriction information, the controller 10 decides that the format of the image file accords with the format indicated by the restriction information (YES at step S38), and further decides whether the current date is equal to or earlier than the expiry date indicated by the restriction information (step S39).

Since the current date "Mar. 1, 2021" is earlier than the expiry date "Mar. 4, 2021", the controller 10 decides that the current date is earlier than the expiry date (YES at step S39), and performs the OCR with respect to the generated image file, thereby recognizing the characters contained in the source (step S40). After step S40, the controller 10 decides whether the characters indicated by the restriction information can be detected from the source image represented by the generated image file, on the basis of the recognized characters (step S41).

In this case, the controller 10 detects a character string 171 "Attendance Sheet" indicated by the restriction information, from the source image 170. Therefore, the controller 10 decides that the characters indicated by the restriction information can be detected from the source image (YES at step S41), and retrieves the authentication information and the location information associated with the inputted access code, from the HDD 18. Then the controller 10 transmits, via the communication device 22, the generated image file to the shared folder indicated by the retrieved location information, using the retrieved authentication information (step S42). After step S42, the controller 10 finishes the image file transmission process.

In contrast, when the access code associated with the inputted character string is not stored in the HDD 18 (NO at step S32), when the size of the image file is larger than the upper limit of the file size indicated by the restriction information (NO at step S37), when the format of the image file discords with the format indicated by the restriction information (NO at step S38), when the current date is later than the expiry date indicated by the restriction information (NO at step S39), or when the characters indicated by the restriction information are unable to be detected from the source image (NO at step S41), the controller 10 causes the display device 15 to display an error screen, announcing that the image file is not to be transmitted (step S43).

For example, when only the information included in the second information is stored in the HDD 18, the controller 10 decides that the restriction information associated with the inputted access code is not stored in the HDD 18 (NO at step S36), and proceeds to step S42, where the controller 10 retrieves the authentication information and the location information associated with the inputted access code from the HDD 18, without deciding whether the condition indicated by the restriction information is satisfied, and transmits, via the communication device 22, the generated image file to the shared folder indicated by the retrieved location information, using the retrieved authentication information.

Now, with the aforementioned first technique and second technique that are generally known, the user who has prepared the shared folder has to notify the location information and the authentication information of the shared folder, in order to enable other users to transmit the image file. In this case, the information may leak to a third party. In addition, the other users have to input the location information and the authentication information, each time the image file is to be transmitted, which is both troublesome and time-consuming. Further, since the image file that can be transmitted to the shared folder is not limited, an unnecessary image file may be transmitted to the shared folder.

According to the first embodiment, unlike the above, the controller 30 of the information processing apparatus 3 generates, upon receipt of the authentication information, the location information, and the restriction information via the operation device 31, the access code using the authentication information, the location information, and the restriction information, and transmits the first information to the image forming apparatus 2 via the communication device 34. The controller 10 of the image forming apparatus 2 stores, upon receipt of the first information via the communication device 22, the authentication information, the location information, the restriction information, and the access code included in the first information, in the HDD 18 in association with one another.

In addition, the controller 10 transmits, via the communication device 22, the image file to the shared folder indicated by the location information, using the authentication information associated with the access code, provided that the image file satisfies the condition indicated by the restriction information associated with the access code, when the character string representing the access code is received via the touch panel 16B, but keeps from transmitting the image file, when the image file does not satisfy the condition indicated by the restriction information.

Thus, since the first user can limit the image file that can be transmitted to the shared folder, simply by inputting the restriction information, an unnecessary image file can be prevented from being transmitted to the shared folder. In addition, since the second user can transmit the image file to the shared folder, simply by inputting the character string representing the access code, the time and trouble for inputting the authentication information and the location information can be saved. Further, the access code is generated on the basis of the authentication information, the location information, and the restriction information, which makes it difficult for a third party to acquire the authentication information and the location information from the access code. Consequently, the leakage of the information to a third party can be prevented.

According to the first embodiment, the controller 30 calculates the hash value using a predetermined hash function, with respect to each of the authentication information, the location information, and the restriction information, and then generates a single first numerical value, finally acquired through the repetitions of the first to the fourth process, as the access code. Such an arrangement further impedes a third party from acquiring the authentication information and the location information from the access code, thereby further assuring that the leakage of the information to the third party is prevented.

According to the first embodiment, the controller 30 accepts at least one of the upper limit of the file size, the format of the image file, and the expiry date, as the restriction information. Therefore, the first user can limit the image file that can be transmitted to the shared folder more appropriately.

According to the first embodiment, further, the controller 30 accepts characters as the restriction information, and the controller 10 decides that the image file satisfies the condition indicated by the restriction information, when the characters indicated by the restriction information can be detected from the source image. Such an arrangement further facilitates the first user to properly limit the image file that can be transmitted to the shared folder.

According to the first embodiment, further, the controller 30 transmits, upon receipt of a plurality of e-mail addresses and the storage location of the original image file representing the original source image, via the operation device 31, the e-mail indicating the access code and the storage location to each of the plurality of e-mail addresses, via the communication device 34. Such an arrangement facilitates the second users to acquire the original source image together with the access code, thereby improving the convenience in use, for both of the first user and the second users.

Second Embodiment

Hereunder, the image forming apparatus 2 including an image reading apparatus 5 according to a second embodiment of the disclosure will be escribed. The image forming apparatus 2 according to the second embodiment is configured in the same way as that of the first embodiment, except that the HDD 18 contains a second generation program for executing a second access code generation process according to the second embodiment, in addition to the foregoing storage program and the transmission program. In the following description, the same aspects as the first embodiment will not be described.

[Operation]

Figure 18A:
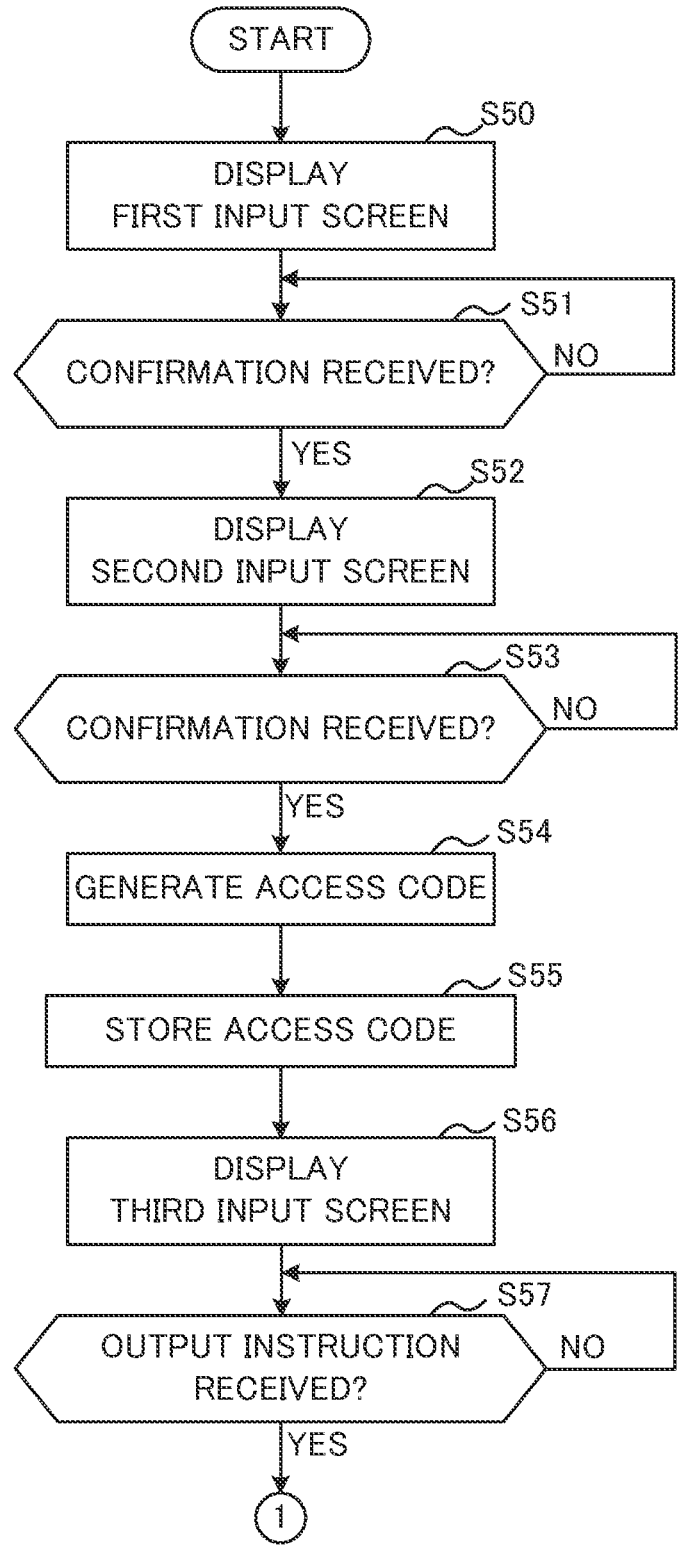
FIG. 18A is a flowchart showing a second access code generation process.
Figure 19:
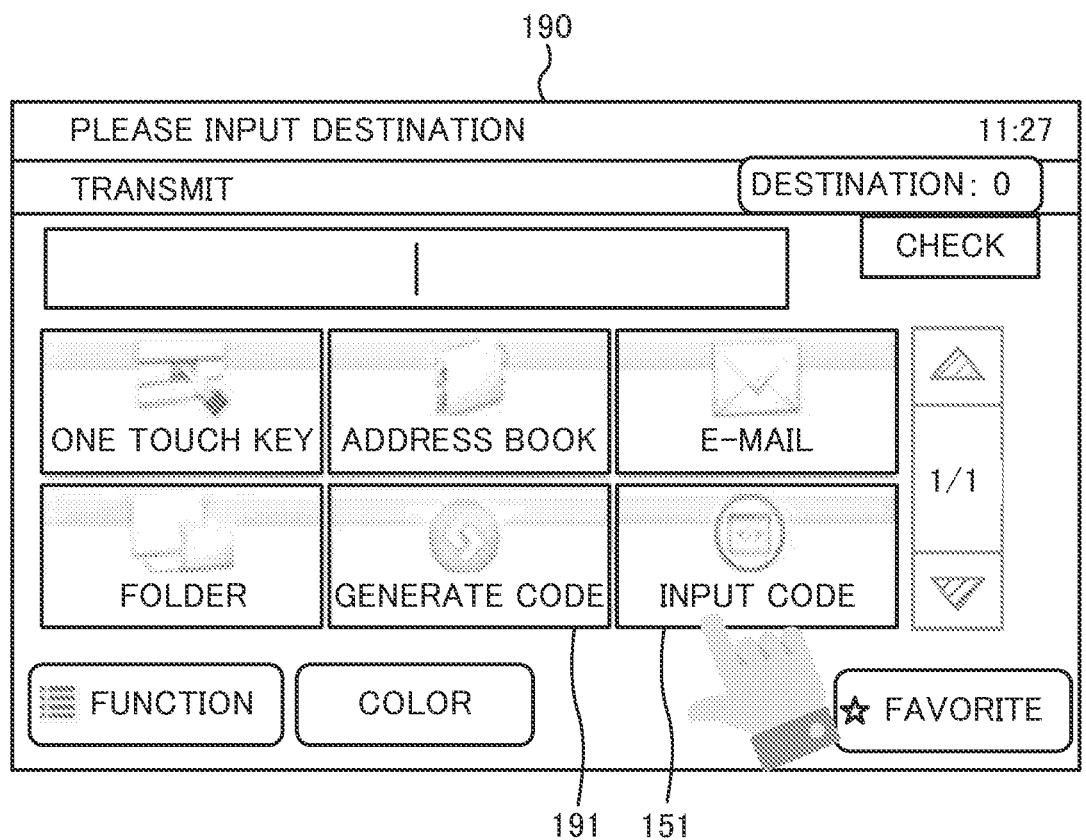
FIG. 19 is a schematic drawing showing another example of the second setup screen.
Figure 20:
FIG. 20 is a schematic drawing showing another example of the first input screen.
Figure 21:
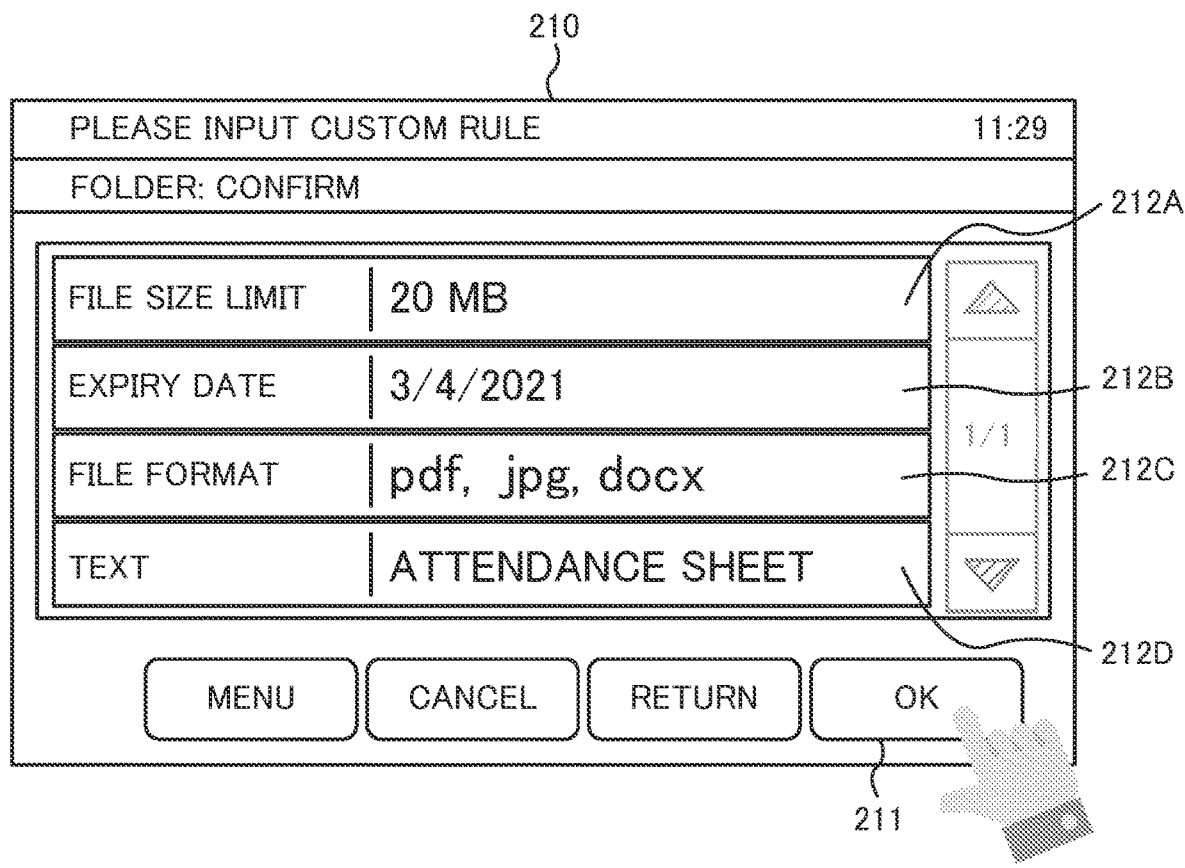
FIG. 21 is a schematic drawing showing another example of the second input screen.

FIG. 18A and FIG. 18B are flowcharts each showing the second access code generation process. FIG. 19 illustrates another example of the second setup screen. FIG. 20 illustrates another example of the first input screen. FIG. 21 illustrates another example of the second input screen. Referring to FIG. 18A to FIG. 21, an operation performed by the image forming apparatus 2 to execute the second access code generation process will be described hereunder.

When the power to the image forming apparatus 2 is turned on, the controller 10 causes the display device 15 to display the home screen 140 shown in FIG. 14. When the first user touches the key 141 in the home screen 140, the touch panel 16B detects the touch operation performed on the key 141, and the controller 10 causes the home screen 140 to display the second setup screen 190 shown in FIG. 19.

When the first user touches the key 191 in the second setup screen 190, the touch panel 16B detects the touch operation performed on the key 191, and the controller 10 starts to execute the second access code generation process shown in FIG. 18A and FIG. 18B, and causes the display device 15 to display the first input screen 200 shown in FIG. 20, through which the location information is to be inputted (step S50).

After step S50, the controller 10 repeats deciding that the definite confirmation has not been made (NO at step S51), until the touch panel 16B detects that a key 201 in the first input screen 200 is touched. In view of the first input screen 200, the first user inputs, through the software keyboard, the host name "kddppc035", the port number "445", and the path "trytry" as the location information, and also the log-in user name "silladore" and the log-in password "pws101", as the authentication information.

When the touch panel 16B detects that the location information and the authentication information have been inputted as above, the controller 10 causes the display device 15 to display the location information and the authentication information inputted as above in fields 202A to 202D, among which only the log-in password is concealed. After inputting the location information and the authentication information, the first user touches the key 201. When the touch panel 16B detects that the key 201 has been touched, the controller 10 decides that the definite confirmation has been made (YES at step S51), and causes the display device 15 to display the second input screen 210 shown in FIG. 21, through which the restriction information is to be inputted (step S52).

After step S52, the controller 10 repeats deciding that the definite confirmation has not been made (NO at step S53), until the touch panel 16B detects that a key 211 in the second input screen 210 is touched. In view of the second input screen 210, the first user inputs, through the software keyboard, the upper limit of the file size "20 MB", the expiry date "Mar. 4, 2021", the file format "pdf, jpg, docx", and the character string "Attendance Sheet", as the restriction information.

When the touch panel 16B detects that the restriction information has been inputted as above, the controller 10 causes the display device 15 to display the inputted restriction information in fields 212A to 212D. After inputting the restriction information, the first user touches the key 211. When the touch panel 16B detects that the key 211 has been touched, the controller 10 decides that the definite confirmation has been made (YES at step S53), and generates the access code using the authentication information, the location information, and the restriction information, in the same way as above (step S54).

After step S54, the controller 10 stores the authentication information, the location information, and the restriction information that have been inputted, and the generated access code, in the HDD 18 in association with one another (step S55). After step S55, the controller 10 causes the display device 15 to display the third input screen 120 shown in FIG. 12 (step S56). At this point, the controller 10 causes the display device 15 to also display the access code, in the predetermined region 121 of the third input screen 120.

After step S56, the controller 10 repeats deciding that the output instruction of the access code has not been received (NO at step S57), until the touch panel 16B detects that the key 126 in the third input screen 120 is touched.

[1] When "E-Mail" is Designated

In view of the third input screen 120, the first user inputs a plurality of e-mail addresses respectively owned by the plurality of second users, through the software keyboard. When the touch panel 16B detects that the plurality of e-mail addresses have been inputted, the controller 10 causes the display device 15 to display the plurality of e-mail addresses inputted, in the field 123.

After inputting the e-mail addresses, the first user touches the checkbox 122B. When the touch panel 16B detects that the checkbox 122B has been touched, the controller 10 causes the display device 15 to display the checkmark in the checkbox 122B, and sets the output method of the access code to "E-Mail".

The first user further inputs, through the software keyboard, the character string "ABCDNET¥Attendance Sheet", indicating the storage location of the original image file representing the image of "Attendance Sheet" which is the original source document. When the touch panel 16B detects that the mentioned storage location has been inputted, the controller 10 causes the display device 15 to display the inputted storage location in the field 125. After inputting the storage location, the first user touches the key 126.

When the touch panel 16B detects that the key 126 has been touched, the controller 10 decides that the output instruction has been received (YES at step S57), and that the output method of the access code has been set to "E-Mail" (YES at step S58), and transmits the e-mail indicating the generated access code and the inputted storage location, to the inputted e-mail address via the communication device 22 (step S59). After step S59, the controller 10 finishes the second access code generation process.

[2] When "Printing" is Designated

In view of the third input screen 120, the first user touches the checkbox 122A. When the touch panel 16B detects that the checkbox 122A has been touched, the controller 10 causes the display device 15 to display the checkmark in the checkbox 122A, and sets the output method of the access code to "Printing".

The first user further inputs the storage location of the original image file representing the image of the original source document, in the same way as above. When the touch panel 16B detects that the mentioned storage location has been inputted, the controller 10 causes the display device 15 to display the inputted storage location in the field 125. After inputting the storage location, the first user touches the key 126.

When the touch panel 16B detects that the key 126 has been touched, the controller 10 decides that the output instruction has been received (YES at step S57), and that the output method of the access code has not been set to "E-Mail" (NO at step S58), but to "Printing" (YES at step S60), and generates the image file representing the image including the generated access code and the inputted storage location. Then the controller 10 causes the image forming device 12 to record the image represented by the generated image file, on the recording sheet P (step S61). After step S61, the controller 10 finishes the second access code generation process.

[3] When "Short Message" is Designated

In view of the third input screen 120, the first user inputs a plurality of telephone numbers respectively owned by the plurality of second users, through the software keyboard. When the touch panel 16B detects that the plurality of telephone numbers have been inputted, the controller 10 causes the display device 15 to display the plurality of telephone numbers inputted, in the field 124.

After inputting the telephone numbers, the first user touches the checkbox 122C. When the touch panel 16B detects that the checkbox 122C has been touched, the controller 10 causes the display device 15 to display the checkmark in the checkbox 122C, and sets the output method of the access code to "Short Message".

The first user further inputs the storage location of the original image file representing the image of the original source document, in the same way as above. When the touch panel 16B detects that the mentioned storage location has been inputted, the controller 10 causes the display device 15 to display the inputted storage location in the field 125. After inputting the storage location, the first user touches the key 126.

When the touch panel 16B detects that the key 126 has been touched, the controller 10 decides that the output instruction has been received (YES at step S57), and that the output method of the access code has been neither set to "E-Mail" nor "Printing" (NO at step S58 and step S60), but to "Short Message", and transmits the short message indicating the generated access code and the inputted storage location to the telephone numbers inputted, via the facsimile communication device 21 (step S62). After step S62, the controller 10 finishes the second access code generation process.

According to the second embodiment, the first user can generate the access code using the image forming apparatus 2, and therefore the convenience in use for the first user can be further improved.

[Other Variations]

According to the first and second embodiments, the controller 30 acquires, when generating the access code, the first numerical value of six digits located at the tail end of the hash value in the first process. However, the disclosure is not limited to such embodiments. For example, the controller 30 may acquire the first numerical value of three digits, or four digits, located at the tail end of the hash value.

The disclosure may be modified in various manners, without limitation to the configuration according to the foregoing embodiments. For example, although the image forming apparatus 2 is exemplified by the color multifunction peripheral in the embodiment, a different type of image forming apparatus, such as a monochrome multifunction peripheral, a copier, or a facsimile machine, may be employed.

The configurations and processings according to the foregoing embodiments, described with reference to FIG. 1 to FIG. 21, are merely exemplary and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image transmission system comprising:
an information processing apparatus; and
an image reading apparatus, wherein
the information processing apparatus including:
a first operation device to which an instruction of a user is inputted;
a first communication device that communicates with the image reading apparatus via a network; and
a first controller including a processor, and configured, when the processor executes a control program, to generate, upon receipt of authentication information for accessing a shared folder, location information of the shared folder, and restriction information indicating a condition of an image file that can be transmitted to the shared holder, via the first operation device, an access code using the authentication information, the location information, and the restriction information, and transmits the authentication information, the location information, the restriction information, and the access code, to the image reading apparatus via the first communication device,
the image reading apparatus including:
a second operation device to which an instruction of the user is inputted;
a second communication device that communicates with the information processing apparatus, via the network;
an image reading device that reads a source document and generates scanned data;
a storage device; and
a second controller including a processor, and configured, when the processor executes a control program, to:

generate the image file representing an image of the source document, on a basis of the scanned data;

store, upon receipt of the authentication information, the location information, the restriction information, and the access code, via the second communication device, the authentication information, the location information, the restriction information, and the access code in the storage device, in association with one another; and transmit, via the second communication device, the image file to the shared holder indicated by the location information, using the authentication information associated with the access code, provided that the image file satisfies the condition indicated by the restriction information associated with the access code, when information indicating the access code is received via the second operation device, but keep from transmitting the image file, when the image file does not satisfy the condition indicated by the restriction information.

2. The image transmission system according to claim 1, wherein the first controller of the information processing apparatus calculates a hash value with respect to each of the location information and the restriction information, using a predetermined hash function, and repeatedly executes a first process including acquiring a first numerical value of a predetermined number of digits, located at a tail end of the calculated hash value, a second process including generating a combination composed of a predetermined number of the first numerical values, according to a predetermined rule, a third process including generating a second numerical value by connecting the first numerical values composing the combination, and a fourth process including calculating a hash value from the second numerical value using the predetermined hash function, until the number of first numerical values becomes one, and determines a single first numerical value finally acquired, as the access code.

3. The image transmission system according to claim 1, wherein the first controller of the information processing apparatus accepts at least one of an upper limit of a file size, a format of the image file, and an expiry date, as the restriction information.

4. The image transmission system according to claim 1, wherein the first controller of the information processing apparatus accepts a character as the restriction information, and the second controller of the image reading apparatus decides that the image file satisfies the condition indicated by the restriction information, when the character indicated by the restriction information can be detected from the source image.

5. The image transmission system according to claim 1, wherein the first controller of the information processing apparatus transmits, upon receipt of an e-mail address and a storage location of an original image file representing an image of an original source document which is an origin of the source document, via the first operation device, an e-mail indicating the access code and the storage location, to the e-mail address via the first communication device.

6. The image transmission system according to claim 1, wherein the first controller of the information processing apparatus generates, upon receipt of an image forming instruction and a storage location of an original image file representing an image of an original source document which is an origin of the source document, via the first operation device, an image file indicating the access code and the storage location, and transmits the image file to the image reading apparatus together with the image forming instruction, via the first communication device, the image reading apparatus further includes an image forming device that forms an image on a recording medium, and the second controller of the image reading apparatus causes the image forming device to form the image represented by the image file on the recording medium, upon receipt of the image forming instruction and the image file, via the second communication device.

7. An image reading apparatus comprising:

a second operation device to which an instruction of a user is inputted;

a second communication device that communicates with an information processing apparatus, via a network;

an image reading device that reads a source document, and generates scanned data;

a storage device; and a second controller including a processor, and configured, when the processor executes a control program, to:

generate an image file representing an image of the source document, on a basis of the scanned data;

generate, upon receipt of authentication information for accessing a shared folder, location information of the shared folder, and restriction information indicating a condition of an image file that can be transmitted to the shared holder, via the second operation device, an access code using the authentication information, the location information, and the restriction information, and store the authentication information, the location information, the restriction information, and the access code in the storage device, in association with one another; and transmit, via the second communication device, the image file to the shared holder indicated by the location information, using the authentication information associated with the access code, provided that the image file satisfies the condition indicated by the restriction information associated with the access code, when information indicating the access code is received via the second operation device, but keep from transmitting the image file, when the image file does not satisfy the condition indicated by the restriction information.

* * * * *